US008996283B2

(12) United States Patent
Morimura et al.

(10) Patent No.: US 8,996,283 B2
(45) Date of Patent: Mar. 31, 2015

(54) VEHICLE CONTROL SYSTEM

(75) Inventors: Junichi Morimura, Suntou-gun (JP); Hiroshi Satoh, Nagoya (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 304 days.

(21) Appl. No.: 13/809,920

(22) PCT Filed: Jul. 22, 2010

(86) PCT No.: PCT/JP2010/062366
§ 371 (c)(1),
(2), (4) Date: Jan. 14, 2013

(87) PCT Pub. No.: WO2012/011184
PCT Pub. Date: Jan. 26, 2012

(65) Prior Publication Data
US 2013/0116914 A1    May 9, 2013

(51) Int. Cl.
H02P 9/04      (2006.01)
F02D 41/00     (2006.01)
B60L 11/14     (2006.01)
B60W 10/06     (2006.01)
B60W 10/08     (2006.01)
B60W 10/10     (2012.01)
B60W 30/18     (2012.01)
H02J 7/14      (2006.01)
F02D 41/12     (2006.01)

(52) U.S. Cl.
CPC ............... *F02D 41/00* (2013.01); *B60L 11/14* (2013.01); *B60W 10/06* (2013.01); *B60W 10/08* (2013.01); *B60W 10/10* (2013.01); *B60W 30/18072* (2013.01); *Y02T 10/7077* (2013.01); *B60L 2240/545* (2013.01); *H02J 7/1446* (2013.01); *B60W 2540/10* (2013.01); *B60Y 2300/46* (2013.01); *H02J 7/1438* (2013.01); *F02D 41/123* (2013.01); *F02D 41/126* (2013.01); *F02D 41/0005* (2013.01)
USPC ................................. 701/112; 123/198 DB

(58) Field of Classification Search
CPC ......... F02B 77/00; F02D 17/02; Y02T 10/18; Y02T 10/6286; F02F 7/006; B60W 20/00; B60W 10/08; B60W 10/06; B60K 6/48
USPC .................. 123/481, 198 F, 198 DB, 339.19; 903/906; 701/112
See application file for complete search history.

(56) References Cited

FOREIGN PATENT DOCUMENTS

| | | |
|---|---|---|
| JP | A-11-107805 | 4/1999 |
| JP | A-2004-120877 | 4/2004 |
| JP | A-2005-291206 | 10/2005 |
| JP | A-2008-114709 | 5/2008 |
| JP | A-2008-286053 | 11/2008 |
| JP | A-2010-183654 | 8/2010 |
| WO | WO 2008/142516 A1 | 11/2008 |

*Primary Examiner* — Hai Huynh
*Assistant Examiner* — Raza Najmuddin
(74) *Attorney, Agent, or Firm* — Oliff PLC

(57) ABSTRACT

A vehicle control system includes an alternator configured to generate power by driven by torque transmitted from an engine as a power source of a vehicle and capable of adjusting a power generation amount, wherein the power generation amount of the alternator is controlled based on physical amounts which change in accordance with an accelerator operation of a driver while a fuel cut control, which stops a supply of a fuel to the engine, is being performed during traveling.

11 Claims, 14 Drawing Sheets

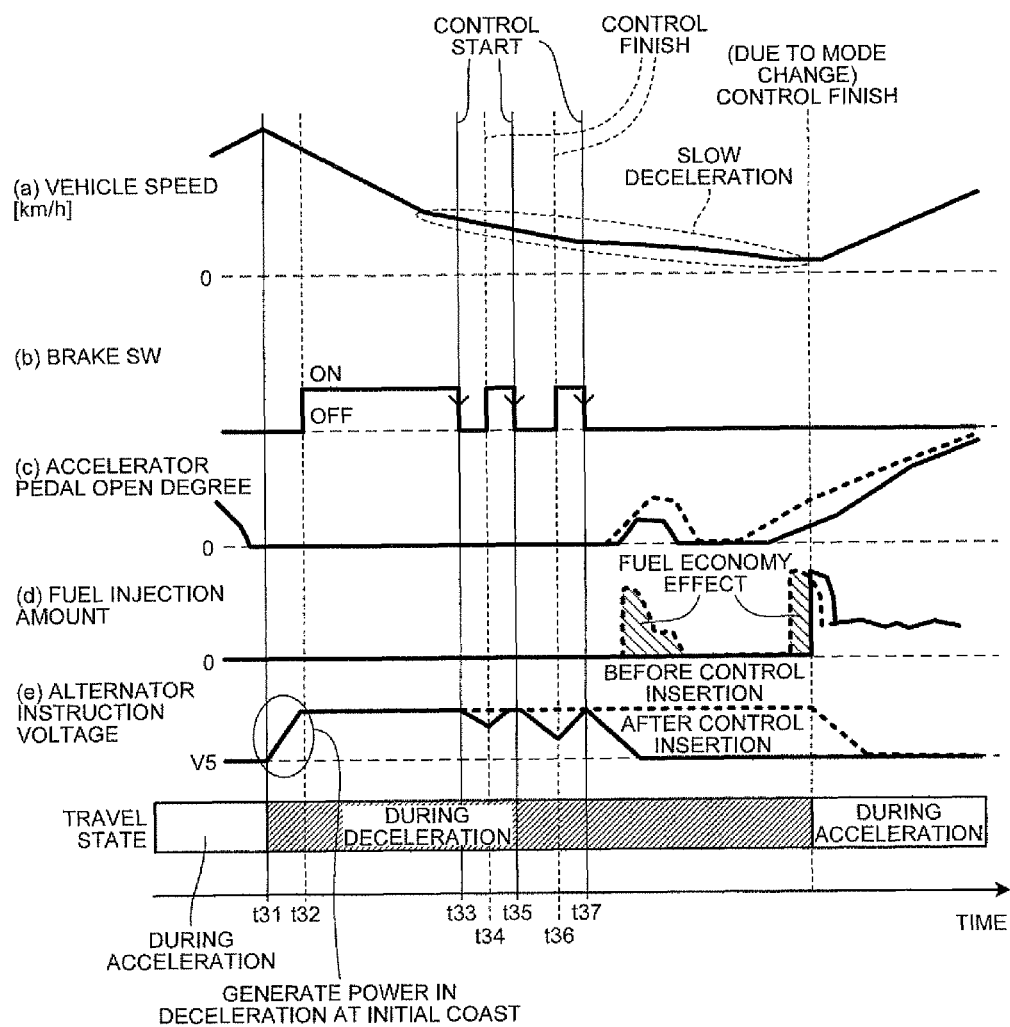

VEHICLE CONTROL SYSTEM

FIELD

The present invention relates to a vehicle control system.

BACKGROUND

Conventionally, there are known fuel cut control technologies which stop a fuel supply to an engine during traveling. Patent Literature 1 discloses a technology of an alternator control device which determines a target deceleration based on a vehicle speed while a deceleration fuel cut is being performed and controls a power generation amount of an alternator so that an actual deceleration becomes the target deceleration.

CITATION LIST

Patent Literature

Patent Literature 1: Japanese Patent Application Laid-open No. 2004-120877

SUMMARY

Technical Problem

There is a case that a driver requests that a some degree of acceleration is performed in a slow deceleration region by operating an accelerator pedal while a fuel cut control is being performed. When a fuel injection operation is performed by the accelerator operation, since a period in which a fuel cut control is performed is reduced, fuel economy is deteriorated. It is desired to suppress a reduction of a period in which the fuel cut control is performed.

An object of the present invention is to provide a vehicle control system capable of extending an execution period of a fuel cut control.

Solution to Problem

A vehicle control system according to the present invention includes an alternator configured to generate power by driven by torque transmitted from an engine as a power source of a vehicle and capable of adjusting a power generation amount, wherein the power generation amount of the alternator is controlled based on physical amounts which change in accordance with an accelerator operation of a driver while a fuel cut control, which stops a supply of a fuel to the engine, is being performed during traveling.

In the vehicle control system, it is preferable that a control of the power generation amount based on the physical amounts is to control the power generation amount of the alternator based on at least any one of an accelerator open degree, a throttle open degree, and target values as to a driving force of the vehicle based on the accelerator open degree.

In the vehicle control system, it is preferable that the power generation amount of the alternator when the power generation amount is controlled based on the physical amounts is smaller than the power generation amount of the alternator just before the control of the power generation amount based on the physical amounts is started.

In the vehicle control system, it is preferable that in the control of the power generation amount based on the physical amounts, the power generation amount of the alternator is reduced up to a power generation amount in accordance with at least any one of the physical amounts and a deceleration of the vehicle.

In the vehicle control system, it is preferable that in the control of the power generation amount based on the physical amounts, the power generation amount of the alternator is reduced to a selectable lower limit power generation amount.

In the vehicle control system, it is preferable that in the control of the power generation amount based on the physical amounts, the power generation amount of the alternator is gradually changed.

In the vehicle control system, it is preferable that while the fuel cut control is being performed, the power generation amount of the alternator is controlled based on a brake physical amount which changes in accordance with a brake operation of the driver.

In the vehicle control system, it is preferable that a control start condition in the control of the power generation amount based on the brake physical amount resides in that the brake physical amount changes from a value showing brake on to a value showing brake off, and the power generation amount of the alternator when the power generation amount is preferably controlled based on the brake physical amount is smaller than the power generation amount of the alternator just before the control of the power generation amount based on the brake physical amount is started.

In the vehicle control system, it is preferable that the power generation amount of the alternator is not controlled based on the brake operation of the driver while the fuel cut control is being performed.

Advantageous Effects of Invention

A vehicle control system according to the present invention controls a power generation amount of an alternator based on a physical amount which changes in response to an accelerator operation of a driver while a fuel cut control is being performed. With the operation, a fuel injection can be suppressed by controlling the power generation amount of the alternator in response to, for example, a deceleration requested by a driver. According to the vehicle control system according to the present invention, an effect can be achieved in that a period in which a fuel cut control is performed can be extended.

BRIEF DESCRIPTION OF DRAWINGS

FIG. 17 is a time chart illustrating an operation when an FC-time power generation amount control of the fifth embodiment is performed.

DESCRIPTION OF EMBODIMENTS

Figure 1:
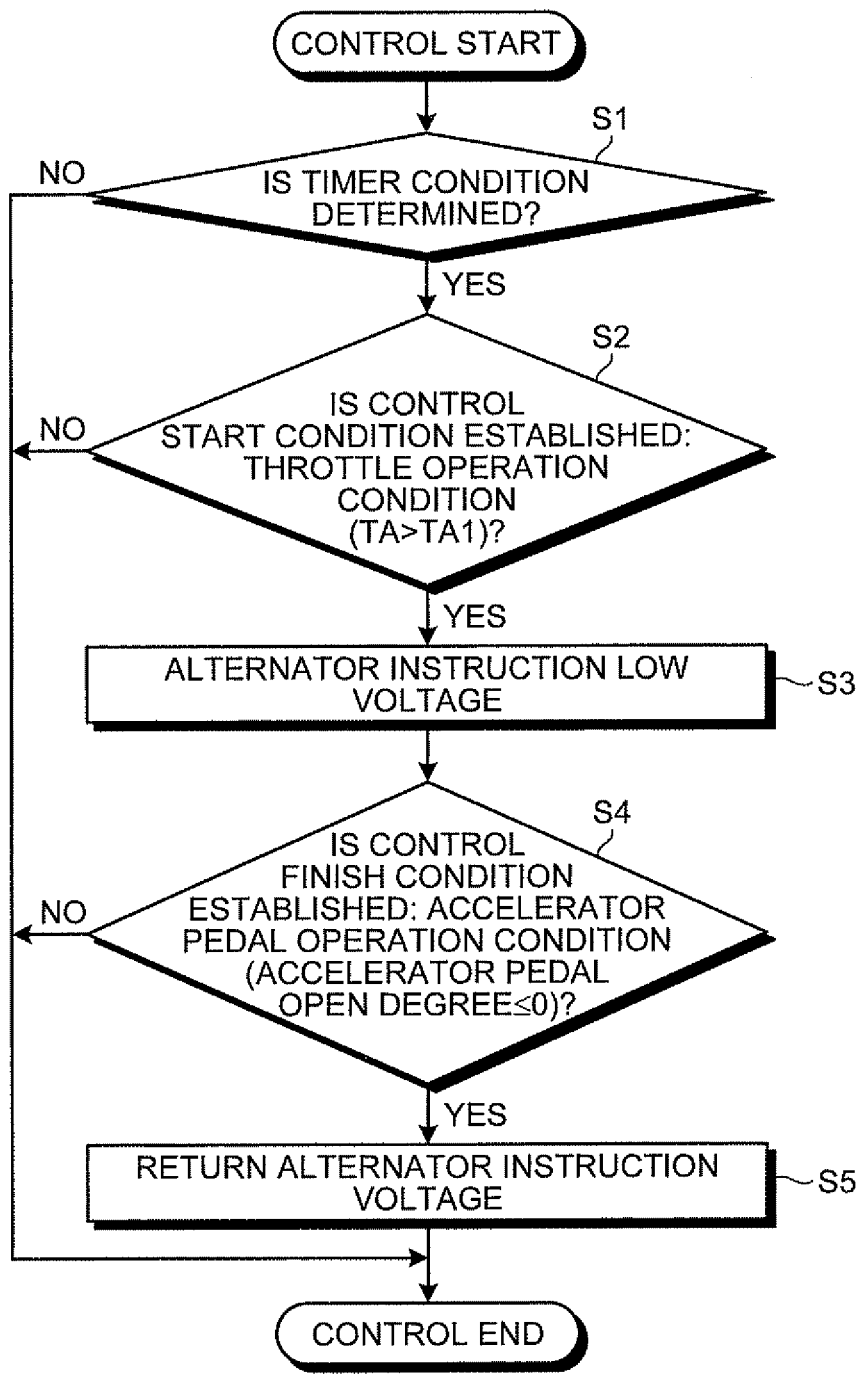
FIG. 1 is a flowchart illustrating an operation of a first embodiment.

A vehicle control system according to embodiments of the present invention will be explained below in detail referring to the drawings. Note that the present invention is by no means limited by the embodiments. Further, components in the embodiments include components that can be easily conceived by a person skilled in the art or substantially same components.

First Embodiment

A first embodiment will be explained referring to FIGS. 1 to 5. The embodiment relates to a vehicle control system. FIG. 1 is a flowchart illustrating an operation of the first embodiment and FIG. 2 is a view illustrating a main portion of a vehicle on which a vehicle control system of the embodiment is mounted.

A vehicle control system 1-1 of the embodiment is configured such that, in a vehicle capable of performing a power generation control of an alternator, when the vehicle enters a slow deceleration region while a fuel cut control is being performed, an alternator instruction voltage is reduced in response to an accelerator operation and a throttle operation. With the operation, since a deceleration can be reduced without injecting a fuel with respect to an accelerator operation of a driver, an execution period of a fuel cut control can be extended.

Figure 2:
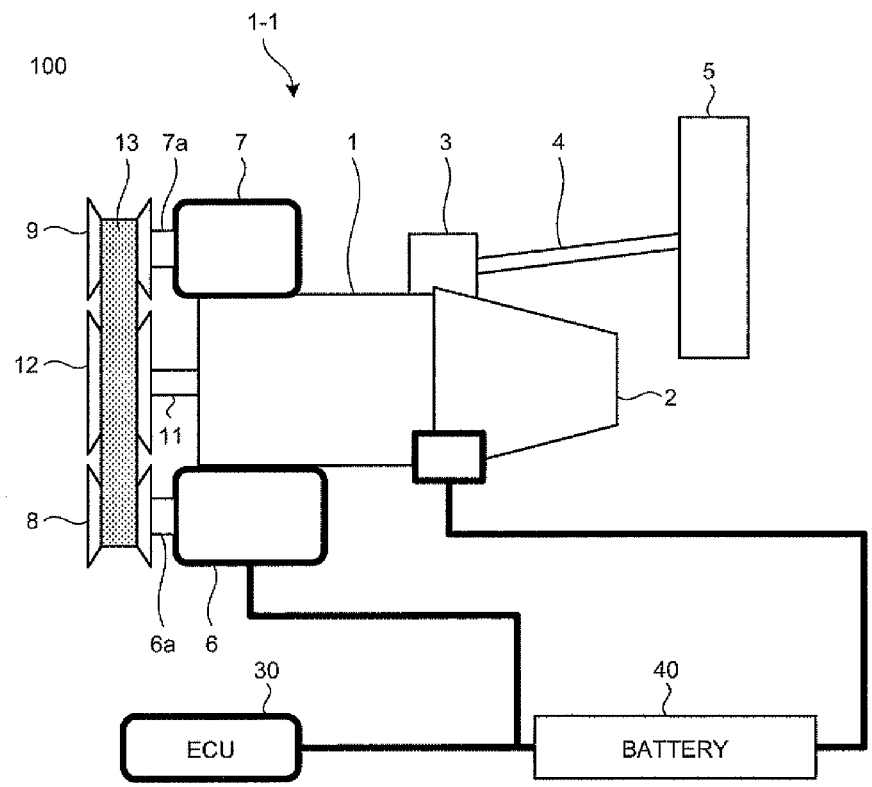
FIG. 2 is a view illustrating a main portion of a vehicle on which a vehicle control system of embodiments is mounted.

In FIG. 2, reference numeral 100 denotes a vehicle. The vehicle 100 includes an engine 1, an automatic transmission 2, an ECU 30, and a battery 40. The engine 1 as a power source of the vehicle 100 is a known internal combustion engine and includes a not illustrated intake air path, a throttle valve which adjusts a flow rate of intake air flowing in the intake air path, a fuel injection device which injects a fuel into the intake air path, and an ignition device which ignites an air-fuel mixture in a cylinder.

The automatic transmission 2 is connected to a rotating shaft 11 of the engine 1. The automatic transmission 2 is connected with a differential gear 3 to which a rotation of the engine 1 whose speed is changed by the automatic transmission 2 is transmitted. The differential gear 3 is connected to a drive shaft 4, and the rotation of the engine 1 which is transmitted to the differential gear 3 is transmitted to a drive wheel 5 via the drive shaft 4.

The engine 1 is provided with an alternator 6 and an accessory 7. The alternator 6 is driven by torque (power) transmitted from the engine 1 and generates power. The accessory 7 is a device which indirectly assists a travel of the vehicle 100 and is a driven machine which operates by receiving mechanical power from the engine 2, converts the mechanical power to a predetermined work and outputs the work. The accessory 7 is, for example, a compressor of an air-conditioner (air-conditioner) mounted on the vehicle.

An endless V-belt 13 is trained around a crank shaft pulley 12 disposed to the rotating shaft 11 of the engine 1, an alternator pulley 8 disposed to a rotating shaft 6a of the alternator 6, and an accessory pulley 9 disposed to a rotating shaft 7a of the accessory 7. When the rotating shaft 11 rotates at the time the engine 1 has operated, the rotation is transmitted respectively to the alternator pulley 8 and to the accessory pulley 9 via the crank shaft pulley 12 and the V-belt 13. With the operation, in the alternator 6, the rotating shaft 6a of the alternator 6 rotates and electric power is generated. Further, in the accessory 7, the rotating shaft 7a of the accessory 7 is driven in rotation. While a fuel cut control, by which a supply of a fuel to the engine 1 is stopped, is being performed, the engine 1 comes into a driven state, and the alternator 6 and the accessory 7 are driven by torque transmitted from the drive wheel 5 via the engine 1.

The alternator 6 is a three-phase alternator provided with, for example, a not illustrated rectifier, converts electric power generated by an alternating current to a direct current and outputs the electric power. The alternator 6 is configured so as to be able to generate electric power of a voltage that is optimum to supply the electric power to the battery 40 and an electric load at an engine revolution speed of the engine 1 which is used very frequently. The alternator 6 also exerts alternator load torque, which is torque in response to a power generation load (drive load) of the alternator 6, on the rotating shaft 11 of the engine 1.

The alternator 6 has the rotating shaft (rotor) 6a and a not illustrated stator. The alternator 6 generates electric power by that a braking/driving force which acts on the rotating shaft 11 of the engine 1 is transmitted from the crank shaft pulley 12 to the rotating shaft 6a via the V belt 13 and the alternator pulley 8 and the rotating shaft 6a rotates with respect to the stator.

More specifically, the alternator 6 is the three-phase alternator composed of a stator coil which is disposed to the not illustrated stator and has three-phase windings and a field coil which is disposed to the rotating shaft 6a and positioned inside of the stator coil. The alternator 6 generates an induced electromotive force to the stator coil by rotating the field coil in an energized state together with the rotating shaft 6a, converts an induced current (three-phase alternating current) to a direct current by a rectifier, and outputs the induced electromotive force.

Figure 3:
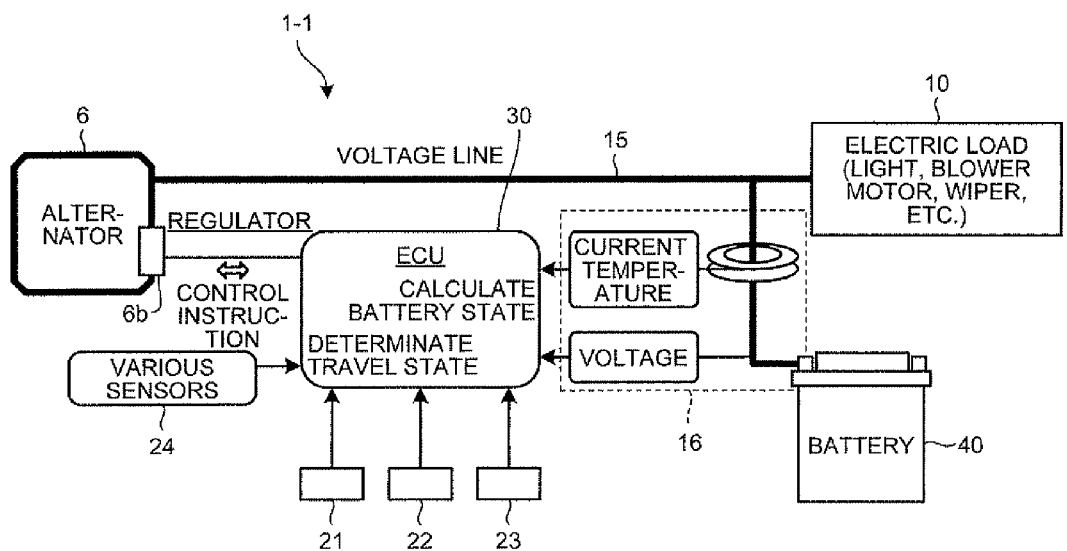
FIG. 3 is a view illustrating a hardware configuration according to a power generation control of the embodiments.

FIG. 3 is a view illustrating a hardware configuration according to a power generation control of the embodiment. As illustrated in FIG. 3, the alternator 6 includes a voltage regulator 6b and controls a field current flowing to the field coil by the voltage regulator 6b in response to a control signal input from the ECU 30. With the operation, the induced electromotive force generated to the stator coil is adjusted, and a power generation amount is controlled. That is, the alternator 6 can adjust the power generation amount, and the power generation load (drive load) of the alternator 6 can be variably set by controlling the field current.

The ECU 30 can control a power generation of the alternator 6 based on a battery state. The alternator 6, the battery 40, and an electric load 10 are electrically connected with each other via a voltage line 15. The battery 40 is a secondary battery and can store electric power generated by the alternator 6. The electric load 10 is, for example, a light, a blower motor, a wiper, and the like. The electric load 10 operates by consuming electric power from at least any one of the battery 40 or the alternator 6. The voltage line 15 is provided with a battery state detection sensor 16. The battery state detection sensor 16 can detect a current value which is charged to the battery 40 via the voltage line 15, a current value which is discharged from the battery 40 via the voltage line 15, a voltage value of the battery 40, and a temperature of the battery 40. Signals showing the charged/discharged current values, the voltage value, and the temperature, which are detected by the battery state detection sensor 16, are output to the ECU 30. The ECU 30 calculates a battery state based on the signals obtained from the battery state detection sensor 16. For example, the ECU 30 can calculate the battery state SOC of the battery 40 by calculating a cumulated value of the charged/discharged currents of the battery 40.

Further, the ECU 30 is connected with an accelerator open degree sensor 21 which detects an accelerator open degree (accelerator pedal open degree), a throttle open degree sensor 22 which detects an open degree of a throttle valve and idle ON/OFF, and a brake switch 23 which detects ON/OFF of a brake. Further, the ECU 30 is connected with various sensors 24 which detect travel state and the like of the vehicle 100. For example, a vehicle speed sensor which detects a vehicle speed of the vehicle 100, a brake operation amount sensor which detects an operation amount (depression force and pedal stroke) to a brake pedal, an engine revolution speed sensor which detects the engine revolution speed, and the like are connected to the ECU 30. The ECU 30 can determine a travelling state of the vehicle 100 based on information obtained from the sensors 21, 22, 23, and 24.

The ECU 30 controls the power generation of the alternator 6 based on the battery state and the travelling state. For example, the ECU 30 determines the power generation amount of the alternator 6, here, an output voltage of the alternator 6 based on an SOC value of the battery 40, the travelling state of the vehicle 100, a state of the electric load 10, and the like. The alternator 6 controls the field current flowing to the field coil by the voltage regulator 6b to realize the determined output voltage.

The alternator 6 can apply a driving force in response to the power generation load on the drive wheel 5. When, for example, a load of the alternator 6 is reduced in a state that the braking/driving force of the engine 1 is constant, the braking/driving force, which acts on the drive wheel 5 via the automatic transmission 2, the differential gear 3, and the drive shaft 4, increases. That is, the alternator 6 generates an alternator braking/driving force, here, an alternator driving force (positive driving force which acts on the vehicle 100 in a forward direction). In contrast, when the load of the alternator 6 is increased in a state that the braking/driving force of the engine 1 is constant, the braking/driving force, which acts on the drive wheel 5 via the automatic transmission 2, the differential gear 3, and the drive shaft 4, is reduced. That is, the alternator 6 generates the alternator braking/driving force, here, the alternator braking force (negative driving force which acts on the vehicle 100 in a backward direction). That is, the braking/driving force, which is obtained by subtracting the alternator braking/driving force generated by the alternator 6 from the braking/driving force of the engine 1, acts on the drive wheel 5. The vehicle control system 1-1 of the embodiment includes the ECU 30 and the alternator 6.

The ECU 30 can perform a drive control of the engine 1 and a gear shift control of the automatic transmission 2. While the vehicle 100 is traveling, the ECU 30 performs a fuel cut control which stops a supply of a fuel to the engine 1 when, for example, the vehicle 100 decelerates. When a predetermined fuel cut execution condition is established at the time the vehicle decelerates, the ECU 30 starts the fuel cut control. The fuel cut execution condition is set as to, for example, a throttle open degree TA, the vehicle speed, and the like and is set so that an execution of the fuel cut control is permitted when, for example, a condition that an idle switch is turned ON in the throttle open degree sensor 22 as well as the vehicle speed is more than a vehicle speed at which a fuel cut can be started is satisfied. The ECU 30 finishes the fuel cut control when the vehicle speed becomes a predetermined fuel cut finish vehicle speed or less and when the throttle open degree TA becomes a predetermined open degree or more while the fuel cut control is being performed.

Here, during a deceleration, the rotating shaft 11 of the engine 1 is applied with a friction load originally acting on the engine 1, loads of respective oil pumps, a load of an air conditioner, a load of the alternator, a pumping loss load, and the like. All of the loads exist as an engine brake amount during the deceleration. When these loads are large and a deceleration level requested by the driver is smaller than the engine brake amount made by these loads, the driver operates an accelerator pedal. At the time, there is a case that the deceleration is adjusted by injecting the fuel. It is a useless consumption of fuel to make the deceleration by intrinsically performing the unnecessary fuel injection regardless that the deceleration is being performed. When the load of the rotating shaft 11 is simply reduced, the deceleration requested by the driver can be realized without injecting the fuel.

The vehicle control system 1-1 of the embodiment controls the power generation amount of the alternator 6 based on physical amounts which change while the fuel cut control is being performed in response to the accelerator operation of the driver. The power generation amount of the alternator 6 when the power generation amount is controlled in response to the accelerator operation is smaller than the power generation amount immediately before the control of the power generation amount in response to the accelerator operation is started. That is, the alternator driving force is increased than before the control is started and the deceleration of the vehicle 100 becomes small by that the power generation amount is controlled in response to the accelerator operation. In the following explanation, the control of the alternator 6, which is performed while the fuel cut control is being performed and which is the control of the power generation amount of the alternator 6 based on the physical amount that changes in response to a drive operation, is also simply described as an "FC-time power generation amount control". The FC-time power generation amount control of the embodiment controls the power generation amount of the alternator 6 based on the physical amount that changes in response to the accelerator operation of the driver.

Figure 4:
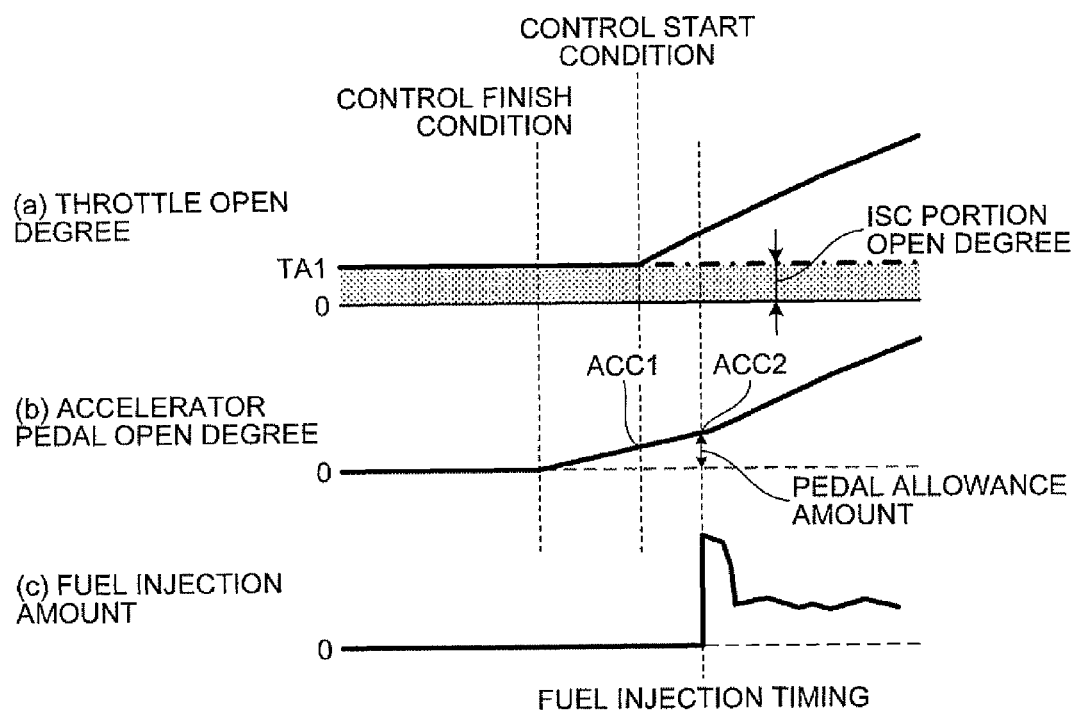
FIG. 4 is a view illustrating a start condition and a finish condition of an FC-time power generation amount control of the first embodiment.

The ECU 30 determines a start and a finish of the FC-time power generation amount control based on the accelerator open degree and the throttle open degree TA. The accelerator open degree and the throttle open degree correspond to the physical amount which changes in response to the accelerator operation of the driver. FIG. 4 is a view explaining a start condition and a finish condition of the FC-time power generation amount control of the embodiment. In FIG. 4, (a) shows the throttle open degree TA, (b) shows the accelerator open degree, and (c) shows a fuel injection amount, respectively. In the throttle open degree TA, an ISC portion open degree TA1 shows an open degree of a throttle valve in idling. The ISC portion open degree TA1 is, for example, a minimum open degree in the throttle open degree TA.

When the accelerator open degree becomes an open degree larger than an open degree denoted by a symbol ACC1, the throttle open degree TA becomes an open degree larger than the ISC portion open degree TA1. That is, in the accelerator open degree, a range of an open degree larger than the open degree ACC1 corresponds to a range of an open degree larger than an open degree in an idle state in the open degree of the throttle valve. Further, in a range of an open degree larger than an open degree denoted by a symbol ACC2 in the accelerator open degree, a fuel injection is performed based on the throttle open degree TA. That is, the open degree ACC2 is the accelerator open degree at which idle ON and idle OFF are switched.

When the throttle open degree TA is larger than the ISC portion open degree TA1, the ECU 30 starts the FC-time power generation amount control. When, for example, the accelerator pedal is depressed from a state that the accelerator open degree is 0 and the throttle open degree TA becomes larger than the ISC portion open degree TA1 while the fuel cut control is being performed, the FC-time power generation amount control is started. That is, the ISC portion open degree TA1 is a threshold value which determines the control start condition of the FC-time power generation amount control and corresponds to a predetermined amount according to the control start condition of the embodiment. Note that the control start may be determined based on the accelerator open degree in addition to the throttle open degree TA. For example, a condition that the accelerator open degree is larger than the open degree ACC1 is established may be employed as the control start condition in addition to the condition that the throttle open degree TA is larger than the ISC portion open degree TA1.

When the accelerator open degree becomes equal to or less than 0 while the FC-time power generation amount control is being performed, the ECU 30 finishes the FC-time power generation amount control. That is, the accelerator open degree 0 is a control finish condition of the FC-time power generation amount control. Note that the accelerator open degree may be linearly processed or may be non-linearly processed. Further, when the accelerator open degree becomes the open degree ACC2 or larger while the FC-time power generation amount control is being performed, the ECU 30 finishes the fuel cut control and the FC-time power generation amount control, respectively and resumes the fuel injection. That is, the open degree ACC2 is timing at which the fuel injection is started and is also the control finish condition of the FC-time power generation amount control.

Figure 5:
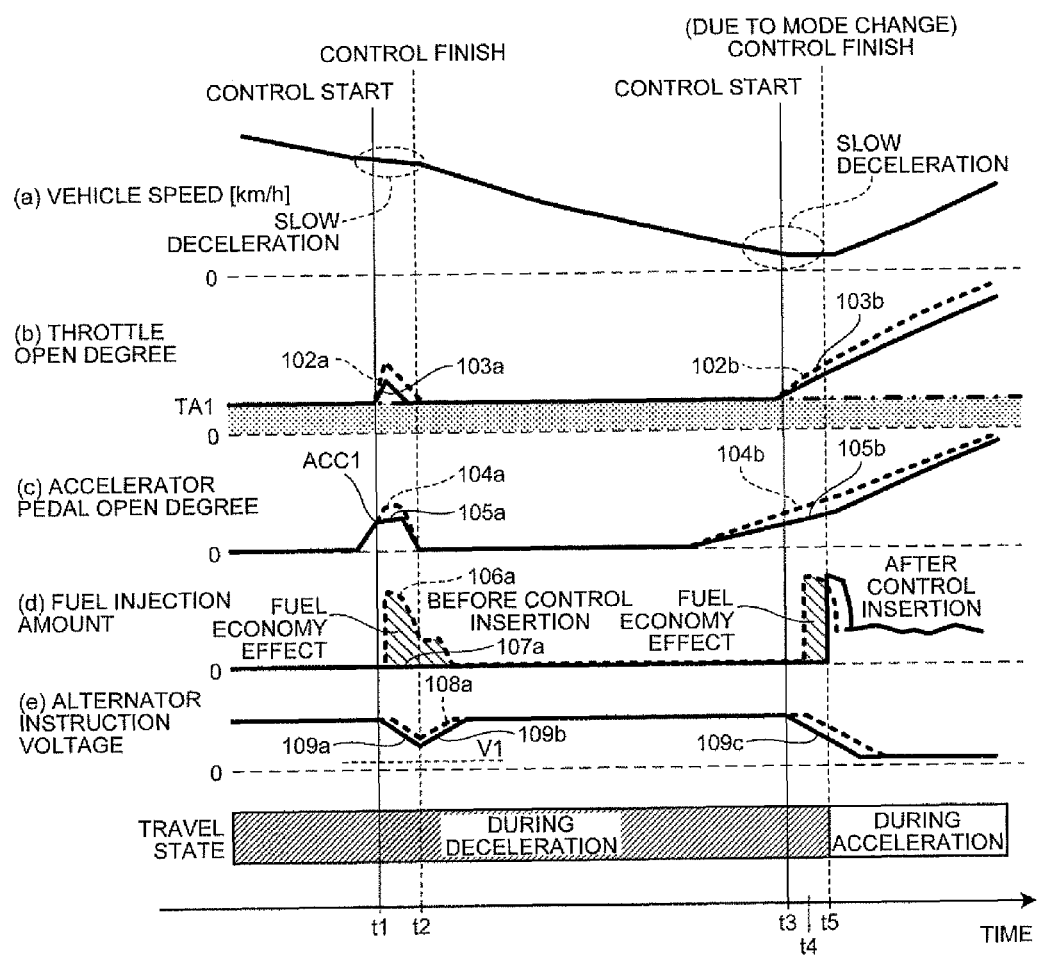
FIG. 5 is a time chart illustrating an operation when the FC-time power generation amount control of the first embodiment is performed.

An operation of the embodiment will be explained below referring to FIGS. 1 and 5. FIG. 5 is a time chart illustrating an operation when the FC-time power generation amount control of the embodiment is performed. In FIG. 5, (a) shows the vehicle speed, (b) shows a throttle open degree TA, (c) shows the accelerator open degree, (d) shows the fuel injection amount, and (e) shows the alternator instruction voltage. The alternator instruction voltage is an instruction value of a voltage output to the alternator 6. The ECU 30 outputs a control signal showing the alternator instruction voltage to the voltage regulator 6b. In FIG. 5, respective solid lines show a transition of respective values in the vehicle 100 of the embodiment which can perform the FC-time power generation amount control. Further, respective broken lines show an example of a transition of the respective values when the FC-time power generation amount control is not performed.

A control flow illustrated in FIG. 1 is performed during the fuel cut control and is repeatedly performed at, for example, a predetermined interval. First, in step S1, whether or not a timer condition is established is determined by the ECU 30. A timer process in step S1 is a process for preventing hunting of the FC-time power generation amount control. When the ECU 30 detects a change (ON) of the throttle open degree at which the control start condition of the FC-time power generation amount control is established and a change (OFF) of the accelerator open degree at which the control finish condition is established a predetermined number of times or more within a predetermined time up to the current time, the ECU 30 determines that the timer condition is not established and prohibits to start the FC-time power generation amount control. When, for example, a number of total times of the number of times of change of throttle open degree ON and the number of times of change of accelerator open degree OFF is equal to or more than a predetermined number of times, it is determined that the timer condition is not established. In contrast, when the change of the throttle open degree ON and the change of the accelerator open degree OFF are not detected for the predetermined number of times or more within the predetermined time up to the current time, the ECU 30 determines that the timer condition is established and does not prohibit to start the FC-time power generation amount control. As a result of the determination in step S1, when it is determined that the timer condition is established (step S1—Y), a process goes to step S2 and otherwise (step S1—N) the control flow is finished.

In step S2, whether or not the control start condition is established is determined by the ECU 30. When the throttle open degree TA at the time is larger than the ISC portion open degree TA1, the ECU 30 makes an affirmative determination in step S2. In FIG. 5, as denoted by reference numerals 103a and 103b, at respective times t1 and t3, the throttle open degree TA changes to an open degree larger than the ISC portion open degree TA1, and the control start condition is established. As a result of the determination in step S2, when it is determined that the control start condition is established (step S2—Y), the process goes to step S3 and otherwise (step S2—N) the control flow is finished.

In step S3, the alternator instruction voltage is set to a low voltage by the ECU 30. In the embodiment, the ECU 30 sets the alternator instruction voltage to a higher voltage in acceleration than in deceleration in the power generation control of the alternator 6. In the acceleration, for example, the ECU 30 causes the alternator 6 to generate only power corresponding to an insufficient amount of battery power based on power requested by the electric load 10 and a discharge capability of the battery 40. In contrast, in the deceleration, the ECU 30 makes the power generation amount of the alternator 6 larger than the power generation amount in the acceleration. The battery 40 can be charged by reducing a load due to the alternator 6 in acceleration as well as effectively using kinetic energy of the vehicle 100 in the deceleration by setting the alternator instruction voltage in the deceleration to a value larger than the alternator instruction voltage in the acceleration. In the FC-time power generation amount control, a request for reducing a deceleration from the driver can be satisfied by reducing the alternator instruction voltage which is previously set to a high voltage in the deceleration in response to the accelerator operation as described above. Since the alternator instruction voltage is reduced by the FC-time power generation amount control, the power generation amount of the alternator 6 when the FC-time power generation amount control is performed is made smaller than the power generation amount of the alternator 6 immediately before the FC-time power generation amount control is started.

When the alternator instruction voltage is reduced in the FC-time power generation amount control, the ECU 30 gradually changes the alternator instruction voltage. As denoted by reference numerals 109a and 109c in FIG. 5, when the control start condition is established, the ECU 30 gradually reduces the alternator instruction voltage to a predetermined voltage V1. With the operation, the power generation amount of the alternator 6 is gradually reduced. The predetermined voltage V1 is a target voltage when the alternator instruction voltage is reduced in the FC-time power generation amount control. The power generation amount of the alternator 6 can be reduced to a power generation amount in accordance with the predetermined voltage V1 by reducing the predetermined voltage V1 to the alternator instruction voltage. During a period in which the accelerator pedal is not released while the FC-time power generation amount control is being performed, the alternator instruction voltage is reduced to the predetermined voltage V1, or when the alternator instruction voltage has already become the predetermined voltage V1, the alternator instruction voltage is kept. Even if the predetermined voltage V1 is set to a predetermined value, the predetermined voltage V1 may be made variable in accordance with the accelerator open degree, the throttle open degree TA, and the like.

For example, the predetermined voltage V1 can be set to a minimum voltage which can cover an insufficient amount of battery power based on the power requested by the electric load 10 and the discharge capability of the battery 40. By setting the predetermined voltage V1 to the minimum voltage, the power generation amount of the alternator 6 can be reduced to a lower limit power generation amount which can be selected in the FC-time power generation amount control. Further, the predetermined voltage V1 when the accelerator open degree and the throttle open degree TA are large may be set to a voltage lower than the predetermined voltage V1 when the open degrees are small. The predetermined voltage V1 may be made variable in accordance with the deceleration of the vehicle 100 in place of or in addition to the accelerator open degree and the throttle open degree TA. When, for example, the deceleration of the vehicle 100 is large, the predetermined voltage V1 can be set to a voltage lower than when the deceleration of the vehicle 100 is small. Since a correspondence relation exists between the vehicle speed and the deceleration, the predetermined voltage V1 may be made variable in accordance with the vehicle speed. When, for example, the vehicle speed is high, there is a tendency that the deceleration of the vehicle 100 becomes larger than when the vehicle speed is low. From what has been described above, when the vehicle speed is high, the predetermined voltage V1 may be set to a voltage lower than when the vehicle speed is low.

When the alternator instruction voltage is reduced, the ECU 30 reduces the alternator instruction voltage at, for example, a uniform voltage gradient. The voltage gradient can be set to, for example, a guard value of a voltage change speed which suppresses an influence on stability of an operation of the electric load 10. That is, the ECU 30 can reduce the alternator instruction voltage at a maximum voltage gradient which is allowed by a guard process of a voltage. Note that a method of reducing the alternator instruction voltage is not limited to the above method. For example, the voltage gradient may be determined based on a magnitude of the accelerator open degree and the throttle open degree TA. When, for example, the accelerator open degree and the throttle open degree TA are large, the voltage gradient may be made to a gradient larger than when the accelerator open degree and the throttle open degree TA are small. Further, the voltage gradient may be determined based on the deceleration and the vehicle speed of the vehicle 100. When, for example, the deceleration and the vehicle speed are large, the voltage gradient may be made to a gradient larger than when the deceleration and the vehicle speed are small. Further, the voltage gradient may be made variable in accordance with the predetermined voltage V1. When, for example, the predetermined voltage V1 is low, the voltage gradient may be made to a gradient larger than when the predetermined voltage V1 is high. Note that the voltage gradient of the alternator instruction voltage may not be constant and may change while the alternator instruction voltage is being reduced.

Since the deceleration is reduced by reducing the alternator instruction voltage, the driver who desires to reduce the deceleration stops depressing the accelerator (refer to reference numeral 105*a*). The vehicle can travel while continuing the fuel cut control by stopping the depression of the accelerator at the accelerator open degree smaller than the open degree ACC2 at which the fuel injection is started (refer to reference numeral 107*a*).

In contrast, when the FC-time power generation amount control is not performed, even if the throttle open degree TA exceeds the ISC portion open degree TA1 at a time t1 and the throttle open degree TA increases as illustrated by reference numeral 102*a*, the deceleration is not reduced different from a case that the FC-time power generation amount control is performed. Accordingly, as illustrated by reference numeral 104*a*, the accelerator pedal is further depressed. As a result, the fuel injection is performed as illustrated by reference numeral 106*a*. That is, according to the vehicle control system 1-1 of the embodiment, the fuel injection can be suppressed, the execution period of the fuel cut control can be extended, and the fuel economy can be improved by satisfying the deceleration reduction request of the driver by removing the alternator load. Note that reference numeral 108*a* illustrates the alternator instruction voltage when the fuel injection 106*a* is performed Further, when the FC-time power generation amount control is performed at the time an operation for gradually depressing the accelerator has been performed to cause a vehicle to travel while being accelerated (refer to reference numeral 105*b* of FIG. 5), the alternator instruction voltage starts to decrease at a time t3 as illustrated by reference numeral 109*c* and the deceleration decreases. Accordingly, an increase of the accelerator open degree 105*b* when the FC-time power generation amount control is performed becomes gentle in comparison with an increase of the accelerator open degree 104*b* when the FC-time power generation amount control is not performed. In correspondence to the above operation, an increase of the throttle open degree 103*b* when the FC-time power generation amount control is performed becomes gentle in comparison with an increase of a throttle open degree 102*b* when the FC-time power generation amount control is not performed. As a result, start timing t5 of the fuel injection when the FC-time power generation amount control is performed is more delayed than start timing t4 of the fuel injection when the FC-time power generation amount control is not performed. With the operation, according to the vehicle control system 1-1 of the embodiment, the execution period of fuel cut control can be extended and the fuel economy can be improved.

Next, in step S4, whether or not the control finish condition is established is determined by the ECU 30. When the accelerator open degree at the time is equal to or less than 0, the ECU 30 makes the affirmative determination in step S4. In FIG. 5, the accelerator open degree decreases up to 0 at a time t2. As a result of the determination in step S4, when it is determined that the control finish condition is established (step S4—Y), the process goes to step S5 and otherwise (step S4—N) the process control flow is finished.

In step S5, the alternator instruction voltage is returned by the ECU 30. The ECU 30 increases the alternator instruction voltage to return the alternator instruction voltage which has been reduced in step S3 to an original voltage. At the time, the ECU 30 gradually increases the alternator instruction voltage as illustrated by reference numeral 109b in FIG. 5. With the operation, a power generation amount of an alternator 6 is gradually increased. The ECU 30 increases the alternator instruction voltage at, for example, a constant voltage gradient. The voltage gradient at the time may be set to the guard value of the change speed of the alternator instruction voltage. An abrupt change of the alternator load torque is suppressed by gradually increasing the alternator instruction voltage as described above. When step S5 is performed, the control flow is finished.

As described above, according to the vehicle control system 1-1 of the embodiment, the FC-time power generation amount control is operated during the deceleration as well as only when the accelerator pedal operation is performed and the alternator instruction voltage is reduced. With the operation, the execution period of the fuel cut control can be extended by suppressing the fuel injection for adjusting the deceleration. Further, at the time t5 at which a mode is changed from the fuel cut control to a fuel injection control which injects the fuel in the engine 1, the fuel starts to be injected in a state that the alternator instruction voltage is set to the low voltage by the FC-time power generation amount control. With the operation, a reduction of an engine output used to drive the alternator 6 permits a larger amount of the engine output to be used as a driving force of the vehicle 100. Accordingly, an acceleration performance of the vehicle 100 (superiority in terms of time and superiority in terms of output) can be improved.

In the FC-time power generation amount control, the power generation amount of the alternator 6 may be controlled based on a target value as to the driving force of the vehicle 100 in place of or in addition to the throttle open degree TA and the accelerator open degree. Here, the target value as to the driving force of the vehicle 100 includes a target driving force, a target acceleration, and the like and is a target value as to a drive control of the vehicle 100. The target value as to the driving force of the vehicle 100 (hereinafter, simply described also as "target value") is created based on, for example, the accelerator open degree. As an example, the target value can be created based on the accelerator open degree and the vehicle speed.

When the ECU 30 performs a travel control based on the target value, the ECU 30 controls the engine and the like so as to realize the target value. When, for example, the engine is in operation, the ECU 30 controls an output of the engine so as to realize the target value. Further, while the fuel cut control is being performed, the target value can be realized by adjusting the alternator load by the FC-time power generation amount control. When, for example, the alternator instruction voltage is reduced in accordance with an increase of the target driving force by increasing the accelerator open degree, the driving force can be controlled in accordance with the target driving force even while the fuel cut control is being performed. When the power generation amount of the alternator 6 is controlled based on the target value as to the driving force, the voltage gradient of the predetermined voltage V1 and the alternator instruction voltage may be determined based on the target value. Further, in the control of the power generation amount of the alternator 6 based on the target value, it may be used as the control start condition of the FC-time power generation amount control that the target value becomes larger than a predetermined value.

In the embodiment, although it is the control start condition that the throttle open degree TA becomes an open degree larger than the ISC portion open degree TA1 during the deceleration, the throttle open degree TA which determines the control start is not limited thereto. Further, in the embodiment, although the ECU 30 determines that the control finish condition is established when the accelerator open degree becomes 0 in the FC-time power generation amount control, a method of determining that the control finish condition is established is not limited thereto. For example, it may be determined that the control finish condition is established when the accelerator open degree becomes equal to or smaller than a predetermined open degree that is larger than 0 and it may be determined that the control finish condition is established when the throttle open degree TA is reduced up to a predetermined open degree, for example, up to the ISC portion open degree TA1.

Note that although a voltage of power generated by the alternator 6 of the embodiment can be varied by the alternator instruction voltage, the alternator 6 of the embodiment is not limited thereto. The alternator 6 may be able to perform a current restriction control by, for example, a LIN communication.

Second Embodiment

A second embodiment will be explained referring to FIGS. 6 to 8. As to the second embodiment, components which have functions similar to those of the embodiment explained above are denoted by the same reference numerals and a duplicate explanation will not be repeated.

In the first embodiment, although the control start condition is established when the throttle open degree TA becomes the open degree larger than the ISC portion open degree TA1, in the embodiment, it is determined whether or not the control start condition is established based on an accelerator open degree before the throttle open degree TA becomes the open degree larger than the ISC portion open degree TA1 in place of the first embodiment. With the determination, control start timing of an FC-time power generation amount control can be put ahead.

Figure 6:
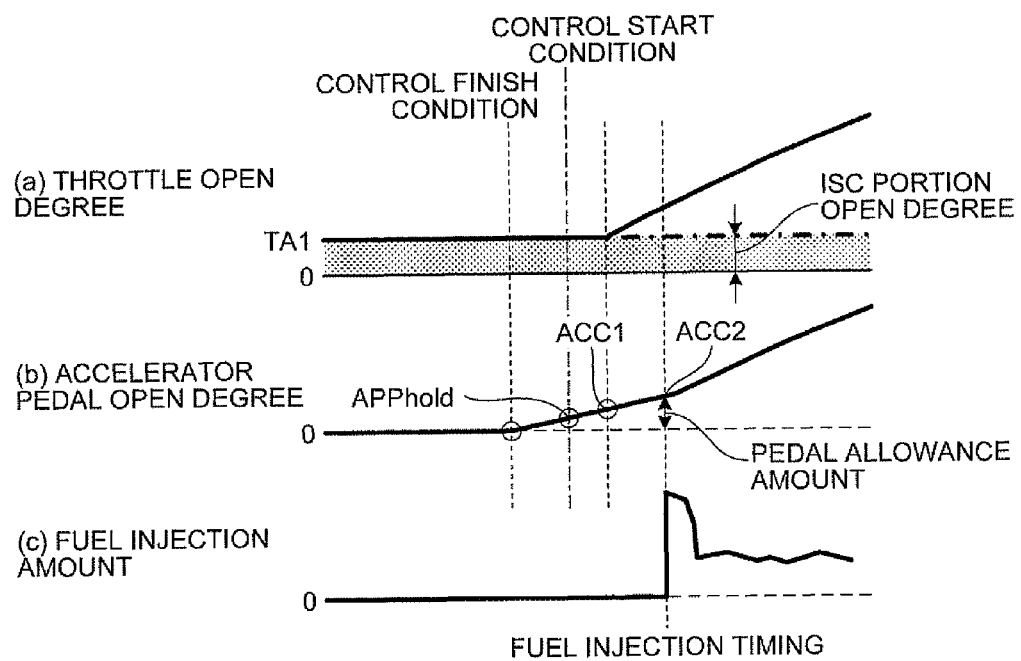
FIG. 6 is a view illustrating a control start condition of a second embodiment.

FIG. 6 is a view explaining a control start condition of the FC-time power generation amount control in the embodiment. In FIG. 6, (a) shows a throttle open degree TA, (b) shows an accelerator open degree, and (c) shows a fuel injection amount, respectively. In the embodiment, an ECU 30 determines the control start condition based on a pedal allowance amount of an accelerator pedal. The pedal allowance amount of the accelerator pedal is an amount from the accelerator open degree 0 to the accelerator open degree at which the throttle open degree TA changes from an ISC portion open degree TA1 to the open degree larger than the ISC portion open degree TA1. The ECU 30 holds the pedal allowance amount of the accelerator pedal from a correspondence relation between the accelerator open degree and the throttle open degree TA in a past accelerator operation. For example, the ECU 30 holds an open degree ACC1, at which the throttle open degree TA starts to increase to the open degree larger than ISC portion open degree TA1 in an accelerator operation from a previous accelerator totally closed state, as the pedal allowance amount of the accelerator pedal.

The ECU 30 uses a value obtained by multiplying the held pedal allowance amount by $\alpha$ as a control start accelerator open degree APPhold which is the accelerator open degree (predetermined amount) of a control start condition of the FC-time power generation amount control. Here $\alpha$ is a value larger than 0 and less than 1 and can be set to, for example, 0.5. When $\alpha$ is set to 0.5, the control start accelerator open degree APPhold becomes 0.5×ACC1. The control start accelerator open degree APPhold determined as described above is the open degree which is smaller than the open degree ACC1 corresponding to the control start condition of the first embodiment. Accordingly, it becomes possible to put ahead a control start of the FC-time power generation amount control by using it as the control start condition that the accelerator open degree exceeds the control start accelerator open degree APPhold.

An operation of the embodiment will be explained referring to FIGS. 7 and 8. FIG. 7 is a flowchart illustrating the operation of the embodiment, and FIG. 8 is a time chart illustrating the operation when the FC-time power generation amount control of the embodiment is performed. In FIG. 8, (a) shows a vehicle speed, (b) shows the throttle open degree TA, (c) shows the accelerator open degree, (d) shows a fuel injection amount, and (e) shows an alternator instruction voltage. In FIG. 8, respective solid lines show a transition of respective values in a vehicle 100 of the embodiment which can perform the FC-time power generation amount control. Further, respective broken lines show an example of the respective values when the FC-time power generation amount control is not performed.

Figure 7:
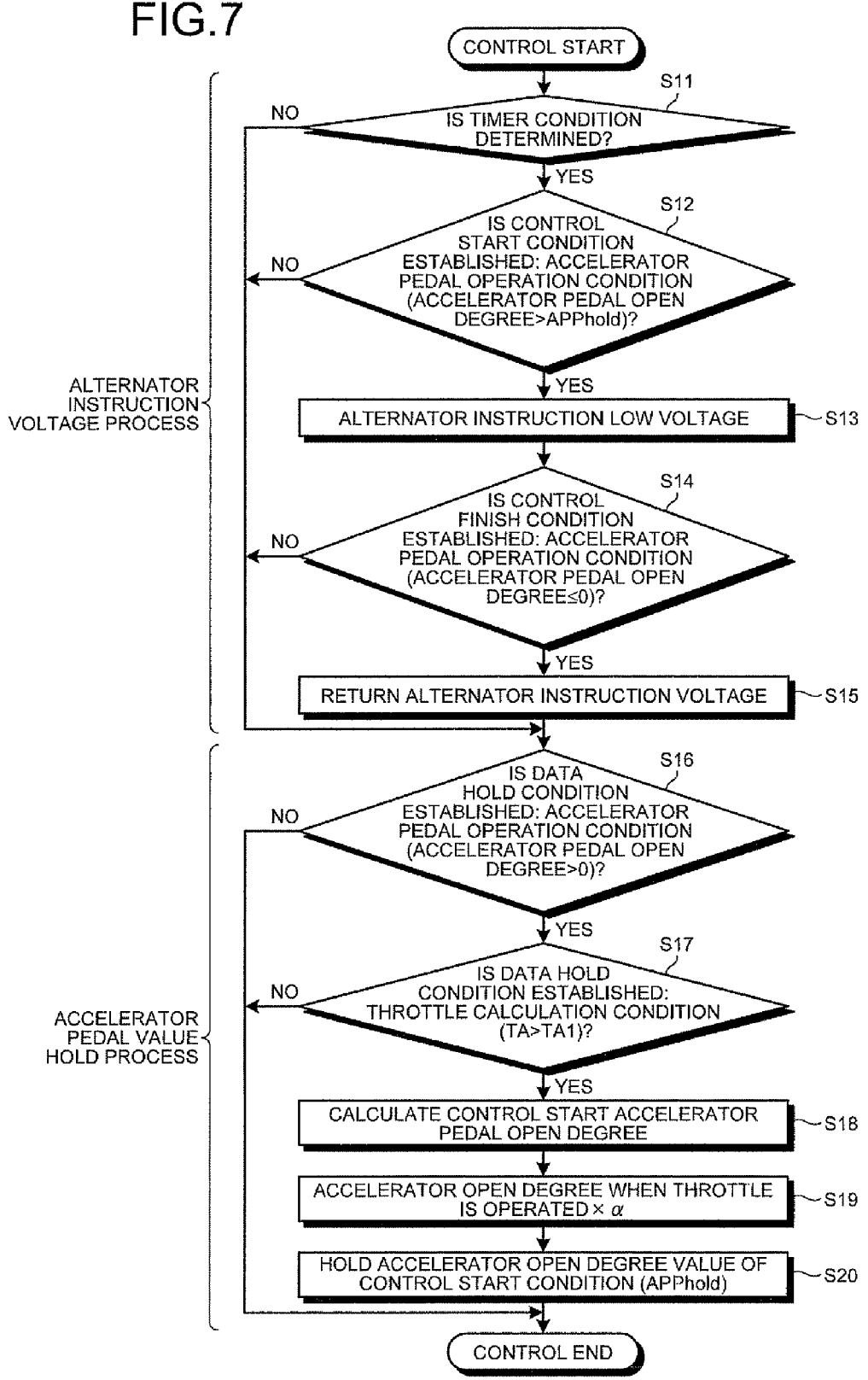
FIG. 7 is a flowchart illustrating an operation of the second embodiment.
Figure 8:
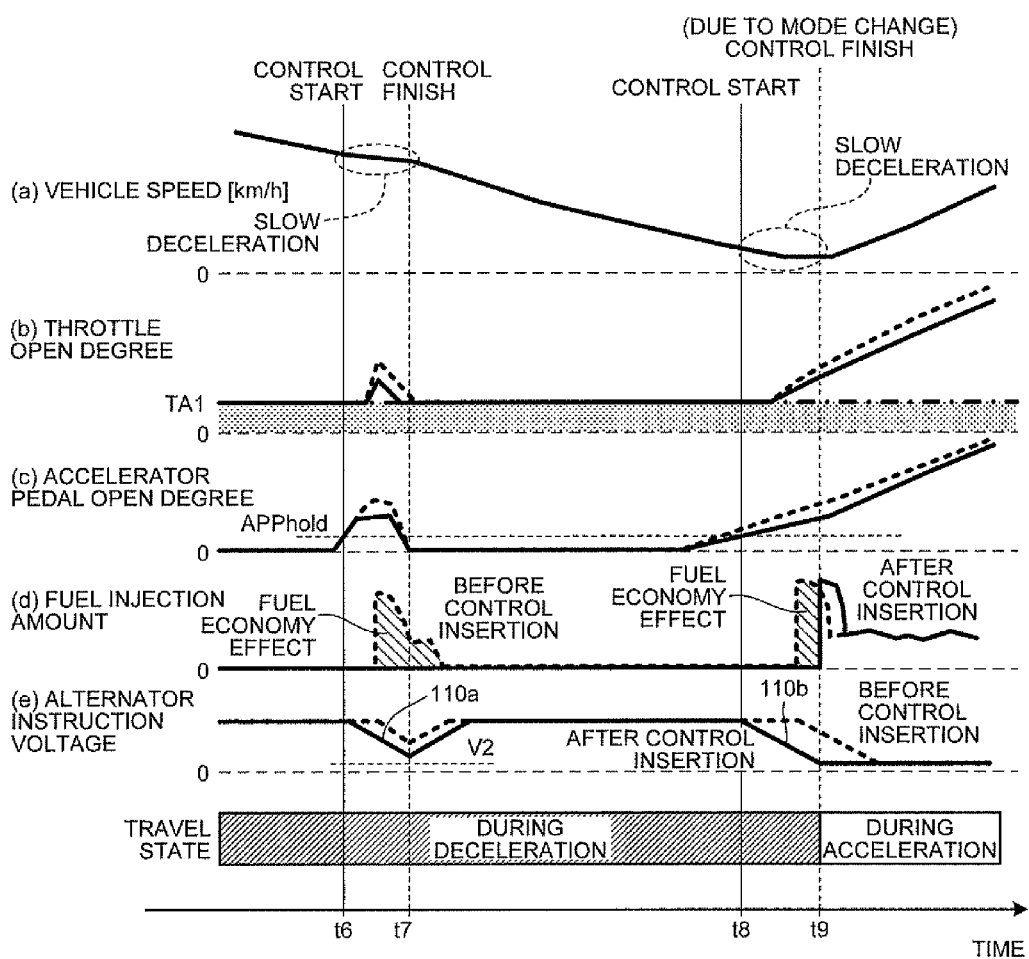
FIG. 8 is a time chart illustrating an operation when an FC-time power generation amount control of the second embodiment is performed.

A control flow illustrated in FIG. 7 is performed while a fuel cut control is being performed and is repeatedly performed at, for example, a predetermined interval. In step S11, whether or not the timer condition is established is determined by the ECU 30. When the ECU 30 detects a change (ON) of an accelerator open degree at which the control start condition of the FC-time power generation amount control is established and a change (OFF) of the accelerator open degree at which a control finish condition is established a predetermined number of times within a preset predetermined time up to the current time, the ECU 30 prohibits to start the FC-time power generation amount control assuming that the timer condition is not established. Here, the ON change of the accelerator open degree in the embodiment means that the accelerator open degree changes from the open degree equal to or smaller than the control start accelerator open degree APPhold to the open degree larger than the control start accelerator open degree APPhold. As a result of the determination in step S11, when it is determined that the timer condition is established (step S11—Y), a process goes to step S12 and otherwise (step S11—N) the process goes to step S16.

In step S12, whether or not the control start condition is established is determined by the ECU 30. When the accelerator open degree at the time is larger than the previously calculated control start accelerator open degree APPhold, the ECU 30 makes an affirmative determination in step S12. In FIG. 8, the accelerator open degree changes to the open degree larger than the control start accelerator open degree APPhold at respective times t6 and t8, and thereby the control start condition is established. As a result of the determination in step S12, when it is determined that the control start condition is established (step S12—Y), the process goes to step S13 and otherwise (step S12—N) the process goes to step S16.

In step S13, the alternator instruction voltage is set to a low voltage by the ECU 30. The ECU 30 gradually reduces the alternator instruction voltage to a predetermined voltage V2. The predetermined voltage V2 may be set to a minimum voltage which can only cover an insufficient amount of battery power likewise the predetermined voltage V1 of the first embodiment or may be made variable in accordance with the throttle open degree TA, the vehicle speed, a deceleration, and the like. Further, a voltage gradient of the alternator instruction voltage may be similar to the voltage gradient of the first embodiment. In the embodiment, since the control start is determined based on the accelerator open degree, the FC-time power generation amount control is started at the times t6 and t8 before a throttle pedal starts an operation as illustrated by reference numerals 110a and 110b in FIG. 8. When step S13 is performed, the process goes to step S14.

In step S14, whether or not the control finish condition is established is determined by the ECU 30. When the accelerator open degree at the time is equal to or less than 0, the ECU 30 makes the affirmative determination in step S14. In FIG. 8, the accelerator open degree decreases up to 0 at a time t7. As a result of the determination in step S14, when it is determined that the control finish condition is established (step S14—Y), the process goes to step S15 and otherwise (step S14—N) the process goes to step S16.

In step S15, the alternator instruction voltage is returned by the ECU 30. The ECU 30 increases the alternator instruction voltage to return the alternator instruction voltage which has been reduced in step S13 to an original voltage. The ECU 30 increases the alternator instruction voltage at, for example, a constant voltage gradient. When step S15 is performed, the process goes to step S16.

In step S16, whether or not data holding condition is established is determined by the ECU 30. The data holding condition is a condition under which the accelerator open degree may be obtained as data for calculating the control start accelerator open degree APPhold. The data holding condition is set in each of the accelerator open degree and the throttle open degree TA. In step S16, the data holding condition is determined as to the accelerator open degree of them. When the accelerator open degree is larger than 0, the ECU 30 makes the affirmative determination in step S16. As a result of the determination, when it is determined that the data holding condition is established (step S16—Y), the process goes to step S17 and otherwise (step S16—N) the control flow is finished.

In step S17, whether or not the data holding condition is established is determined by the ECU 30. In step S17, the data holding condition as to the throttle open degree TA is determined. When the throttle open degree TA is larger than the ISC portion open degree TA1, the ECU 30 makes the affirmative determination in step S17. As a result of the determination, when it is determined that the data holding condition is established (step S17—Y), the process goes to step S18 and otherwise (step S17—N) the control flow is finished.

In step S18, a calculation of a control start accelerator pedal open degree is started by the ECU 30.

In next step S19, a value is calculated by multiplying the accelerator open degree when a throttle is operated by a coefficient α by the ECU 30. The accelerator open degree when the throttle is operated is the accelerator open degree from a time at which the throttle pedal in a state that the throttle open degree TA has been equal to the ISC portion open degree TA1 starts an operation to a time at which the throttle open degree TA becomes larger than the ISC portion open degree TA1.

Next, in step S20, an accelerator open degree value of the control start condition is held by the ECU 30. The ECU 30 holds the value calculated in step S19 as the control start accelerator open degree APPhold. When step S20 is performed, the control flow is finished.

According to the vehicle control system 1-1 of the embodiment, start timing of the FC-time power generation amount control can be put ahead with respect to the accelerator operation of the driver. With the operation, a response to a deceleration reduction request of the driver can be improved. Further, since the start timing of the FC-time power generation amount control is put ahead, when the vehicle 100 becomes travelling while being accelerated, the alternator instruction voltage becomes lower voltage during a period until a time (for example, a time t9 of FIG. 8) at which a fuel injection is started. Accordingly, a large amount of an engine output can be used to a driving force of the vehicle 100, and therefore an acceleration performance can be improved.

Third Embodiment

Figure 9:
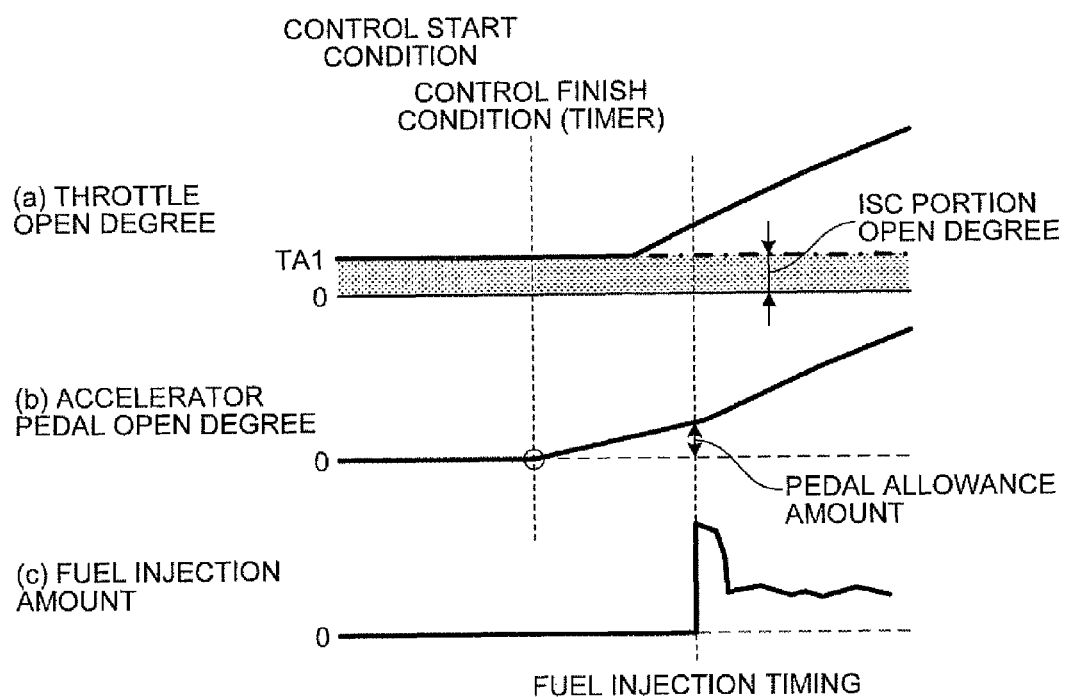
FIG. 9 is a view illustrating a control start condition and a control finish condition of a third embodiment.

A third embodiment will be explained referring to FIGS. 9 to 11. As to the third embodiment, components which have functions similar to those of the embodiments explained above are denoted by the same reference numerals and a duplicate explanation will not be repeated.

The embodiment is different from the respective embodiments in a control start condition and a control finish condition of an FC-time power generation amount control. FIG. 9 is a view explaining the control start condition and the control finish condition of the FC-time power generation amount control of the embodiment. In FIG. 9, (a) shows a throttle open degree TA, (b) shows an accelerator open degree, and (c) shows a fuel injection amount, respectively.

In the embodiment, when the accelerator open degree becomes larger than 0 (a predetermined amount) while a fuel cut control is being performed, the control start condition is established. Further, when the accelerator open degree becomes 0 while the FC-time power generation amount control is being performed, the FC-time power generation amount control is continuously performed until a predetermined wait time elapses after the accelerator open degree 0 has been confirmed. When the wait time has elapsed in the state of the accelerator open degree 0, the control finish condition is established, and the FC-time power generation amount control is finished. With the operation, an alternator instruction voltage becomes a low voltage in many cases.

Figure 10:
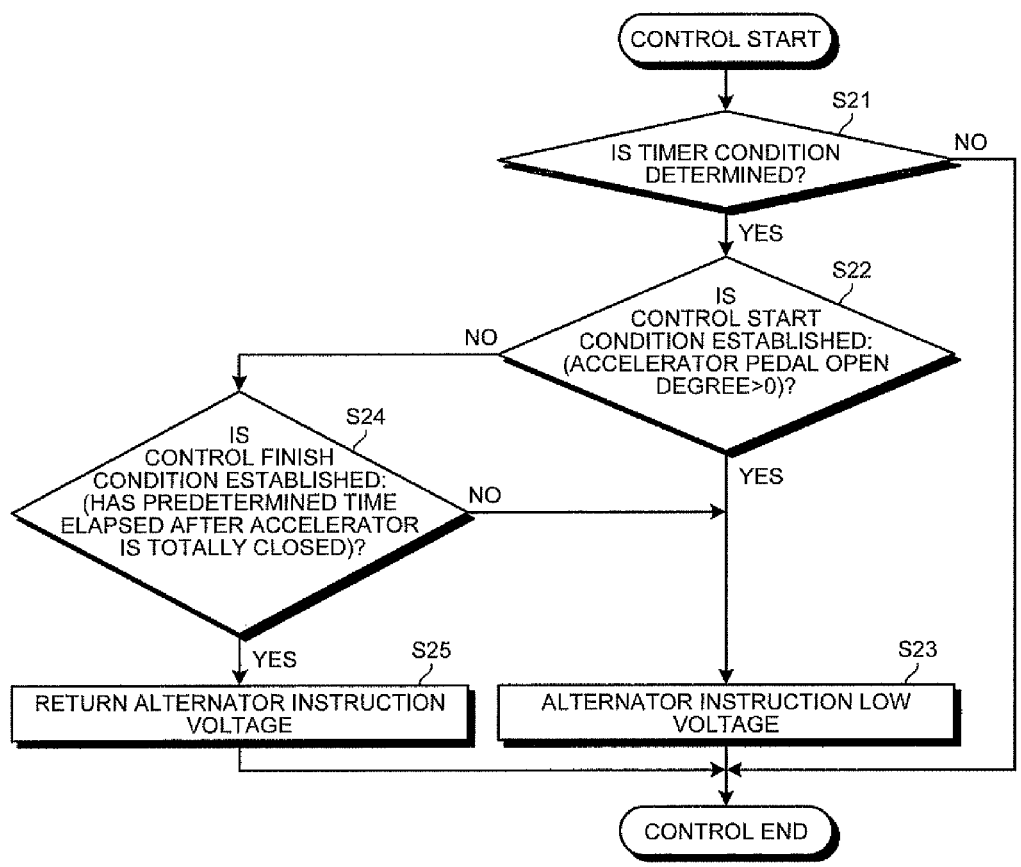
FIG. 10 is a flowchart illustrating an operation of the third embodiment.
Figure 11:
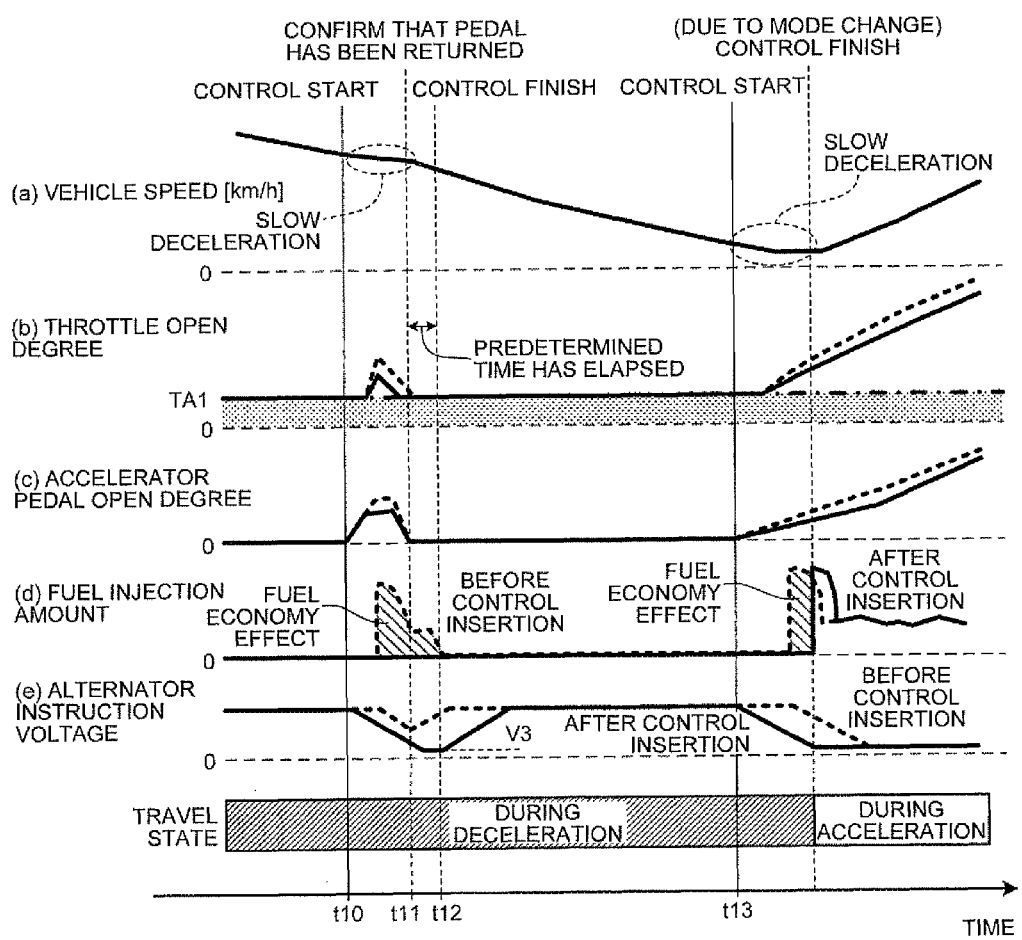
FIG. 11 is a time chart illustrating an operation when an FC-time power generation amount control of the third embodiment is performed.

Referring to FIGS. 10 and 11, an operation of the embodiment will be explained. FIG. 10 is a flowchart illustrating the operation of the embodiment, and FIG. 11 is a time chart illustrating the operation when the FC-time power generation amount control of the embodiment is performed. In FIG. 11, (a) shows a vehicle speed, (b) shows a throttle open degree TA, (c) shows an accelerator open degree, (d) shows a fuel injection amount, and (e) shows an alternator instruction voltage. In FIG. 11, respective solid lines show a transition of respective values in a vehicle 100 of the embodiment which can perform the FC-time power generation amount control. Further, respective broken lines show an example of a transition of the respective values when the FC-time power generation amount control is not performed.

A control flow illustrated in FIG. 10 is performed while a fuel cut control is being performed and repeatedly performed at, for example, a predetermined interval. In step S21, whether or not a timer condition is established is determined by an ECU 30. When the ECU 30 detects a change (ON) of accelerator open degree at which the control start condition of the FC-time power generation amount control is established and a change (OFF) of accelerator open degree at which the control finish condition is established a predetermined number of times or more within a predetermined time up to the current time, the ECU 30 determines that the timer condition is not established and prohibits to start the FC-time power generation amount control. Here, the ON change of the accelerator open degree in the embodiment means that the accelerator open degree changes from a state of 0 to the open degree larger than 0. Further, the OFF change of the accelerator open degree means that the accelerator open degree larger than 0 becomes 0 and thereafter a wait time elapses in the state of the accelerator open degree 0. It may be simply called an OFF change of the accelerator open degree that the accelerator open degree becomes 0. As a result of the determination in step S21, when it is determined that the timer condition is established (step S21—Y), a process goes to step S22 and otherwise (step S21—N) the control flow is finished.

In step S22, whether or not the control start condition is established is determined by the ECU 30. When the accelerator open degree is larger than 0, the ECU 30 determines that the control start condition is established.

In FIG. 11, the accelerator open degree changes to the open degree larger than 0 at each of times t10 and t13 and the control start condition is established. As a result of the determination in step S22, when it is determined that the control start condition is established (step S22—Y), the process goes to step S23 and otherwise (step S22—N) the process goes to step S24.

In step S23, the alternator instruction voltage is set to a low voltage by the ECU 30. The ECU 30 gradually reduces the alternator instruction voltage to a predetermined voltage V3. The predetermined voltage V3 may be set to a minimum voltage which can only cover an insufficient amount of battery power likewise the predetermined voltage V1 of the first embodiment or may be made variable in accordance with the throttle open degree TA, the vehicle speed, a deceleration, and the like. Further, a voltage gradient of the alternator instruction voltage may be similar to the voltage gradient of the first embodiment. In the embodiment, since the FC-time power generation amount control is started at timing at which the accelerator open degree becomes larger than 0, a responsiveness to a deceleration reduction request of a driver is enhanced. When step S23 is performed, the control flow is finished.

When a negative determination is made in step S22 and the process goes to step S24, whether or not the control finish condition is established is determined by the ECU 30 in step S24. When the state that the accelerator open degree is 0 continues for a predetermined wait time while the FC-time power generation amount control is being performed, the ECU 30 determines that the control finish condition is established. The ECU 30 counts a continuation time of the state of the accelerator open degree 0 by a timer and can perform a determination in step S24 based on a counter value. In FIG. 11, at a time til, the accelerator open degree is set to 0 and totally closed, and at a time t12 the wait time has elapsed and the control finish condition is established. As a result of the determination in step S24, when it is determined that the control finish condition is established (step S24—Y), the process goes to step S25 and otherwise (step S24—N) the process goes to step S23 and the FC-time power generation amount control is continued.

In step S25, the alternator instruction voltage is returned by the ECU 30. The ECU 30 increases the alternator instruction voltage to return the alternator instruction voltage which has been reduced in step S23 to an original voltage. The ECU 30 increases the alternator instruction voltage at, for example, a constant voltage gradient. When step S25 is performed, the control flow is finished.

According to a vehicle control system 1-1 of the embodiment, start timing of the FC-time power generation amount control can be put ahead with respect to an accelerator operation of the driver. With the operation, an improvement of a response to a deceleration reduction request of the driver, an improvement of an acceleration performance when the vehicle 100 becomes travelling by being accelerated from the FC-time power generation amount control, and the like become possible.

Fourth Embodiment

A fourth embodiment will be explained referring to FIGS. 12 to 14. As to the fourth embodiment, components which have functions similar to those of the embodiments explained above are denoted by the same reference numerals and a duplicate explanation will not be repeated. The embodiment is different from the respective embodiments in that a power generation amount of an alternator 6 is controlled based on brake physical amounts which are changed in accordance with a brake operation.

Figure 12:
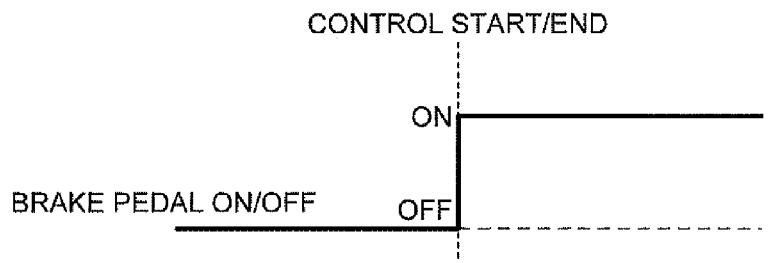
FIG. 12 is a view illustrating a control start condition and a control finish condition of a fourth embodiment.

FIG. 12 is a view explaining a control start condition and a control finish condition of an FC-time power generation amount control based on the brake operation in the embodiment. When a brake pedal is released at the time the brake operation has been performed while a fuel cut control is being performed, an ECU 30 determines that the control start condition of the FC-time power generation amount control is established. That is, in the control start condition, the brake physical amounts change from a value showing a brake (ON) to a value showing a brake (OFF). Further, when a depression operation is performed to a brake pedal which has not been depressed up to the time while the fuel cut control is being performed, it is determined that the control finish condition is established.

Whether or not the control start condition and the control finish condition are established can be determined based on, for example, a detection result of a brake switch 23. The brake switch 23 detects whether or not an operation to the brake pedal is performed. When, for example, a stroke of the brake pedal is equal to or more than a predetermined stroke, the brake switch 23 outputs a signal showing the brake ON, whereas when the stroke of the brake pedal is less than the predetermined stroke, the brake switch 23 outputs a signal showing the brake OFF. That is, the stroke of the brake pedal and the output of the brake switch 23 are the brake physical amounts which change in accordance with the brake operation of a driver.

The ECU 30 can detect a change from a brake non-operated state to a brake operated state (brake OFF→brake ON) and a change from the brake operated state to a brake released state (brake ON→brake OFF), respectively based on a result of detection of the brake switch 23. Note that the brake ON/OFF may be detected based on a signal output from a brake operation amount sensor.

An operation of the embodiment will be explained referring to FIGS. 13 and 14. FIG. 13 is a flowchart illustrating the operation of the embodiment, and FIG. 14 is a time chart illustrating the operation when the FC-time power generation amount control of the embodiment is performed. In FIG. 14, (a) shows a vehicle speed, (b) shows a state of the brake switch, (c) shows an accelerator open degree, (d) shows a fuel injection amount, and (e) shows an alternator instruction voltage. In FIG. 14, respective solid lines show a transition of respective values in a vehicle 100 of the embodiment which can perform the FC-time power generation amount control based on the brake operation. Further, respective broken lines show an example of a transition of the respective values when the FC-time power generation amount control based on the brake operation is not performed.

Figure 13:
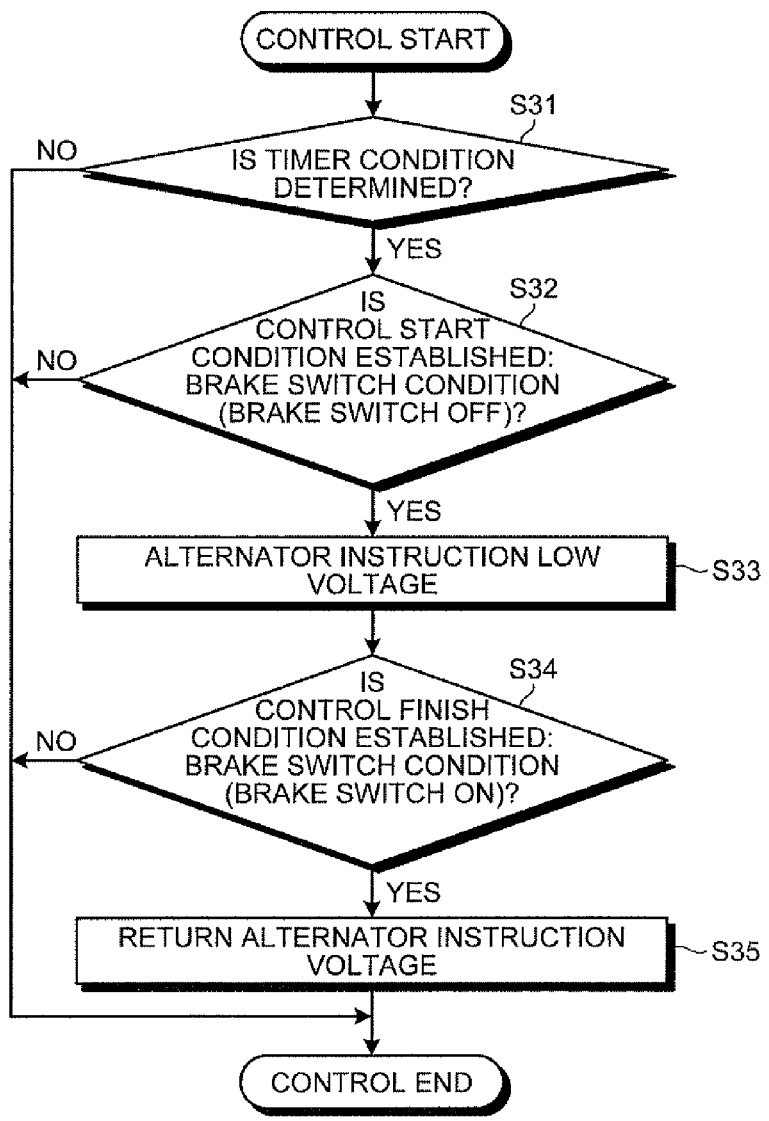
FIG. 13 is a flowchart illustrating an operation of the fourth embodiment.
Figure 14:
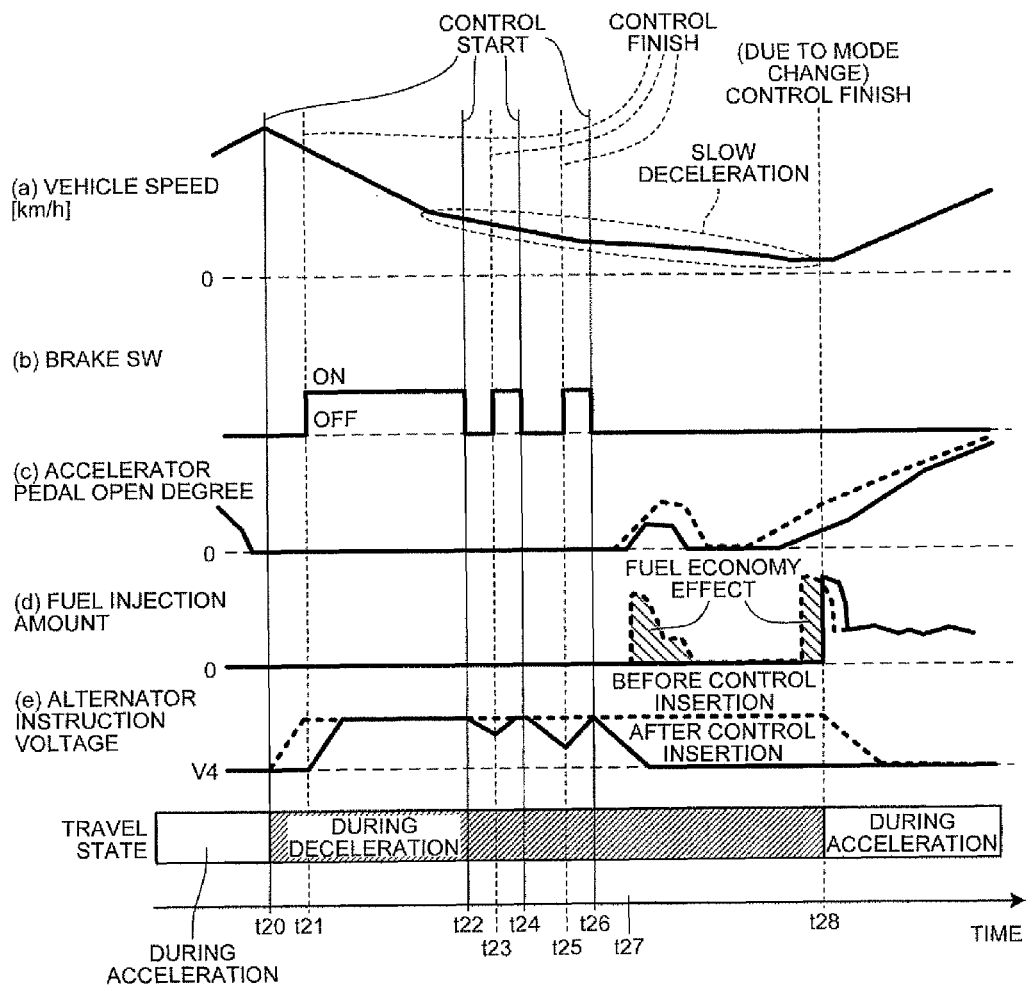
FIG. 14 is a time chart illustrating an operation when an FC-time power generation amount control of the fourth embodiment is performed.

A control flow illustrated in FIG. 13 is performed while the fuel cut control is being performed and repeatedly performed at, for example, a predetermined interval. First, in step S31, whether or not a timer condition is established is determined by the ECU 30. When switching between the brake ON and the brake OFF is detected a predetermined number of times or more within a preset predetermined time up to the current time, the ECU 30 determines that the timer condition is not established and prohibits starting the FC-time power generation amount control. As a result of the determination, when it is determined that the timer condition is established, (step S31—Y), a process goes to step S32 and otherwise (step S31—N) the control flow is finished.

In step S32, whether or not the control start condition is established is determined by the ECU 30. The brake switch 23 is turned OFF, the ECU 30 determines that the control start condition is established. In FIG. 14, the control start condition is established at times t20, t22, t24, and t26, respectively by turning OFF the brake switch. As a result of the determination in step S32, when it is determined that the control start condition is established (step S32—Y), the process goes to step S33 and otherwise (step S32—N) the control flow is finished.

In step S33, an alternator instruction voltage is set to a low voltage by the ECU 30. The ECU 30 gradually reduces the alternator instruction voltage to a preset predetermined voltage V4. A power generation amount of the alternator 6 when the FC-time power generation amount control is performed is made smaller than the power generation amount of the alternator 6 immediately before the FC-time power generation amount control is performed by that the alternator instruction voltage is reduced by the FC-time power generation amount control. The predetermined voltage V4 can be set to a minimum voltage which can only cover an insufficient amount of battery power based on, for example, power requested by an electric load 10 and a discharge capability of a battery 40. Otherwise, the predetermined voltage V4 may be set to a voltage between the minimum voltage and a maximum selectable voltage. The predetermined voltage V4 may be made variable in accordance with, for example, a deceleration and the vehicle speed likewise the predetermined voltage V1 of the first embodiment. Further, a voltage gradient when the alternator instruction voltage is reduced may be set to a guard value of a voltage change speed likewise the voltage gradient of the first embodiment or may be determined in accordance with the deceleration and the vehicle speed. Although the voltage gradient when the alternator instruction voltage is reduced may be a uniform gradient, the voltage gradient is not limited thereto and may change while the alternator instruction voltage is being reduced. When step S33 is performed, the process goes to step S34.

In step S34, whether or not the control finish condition is established is determined by the ECU 30. When the brake switch 23 is turned ON, the ECU 30 determines that the control finish condition is established. In FIG. 14, the control finish condition is established at times t21, t23, and t25, respectively by turning ON a brake. As a result of the determination in step S34, when it is determined that the control finish condition is established (step S34—Y), the process goes to step S35 and otherwise (step S34—N) the control flow is finished.

In step S35, the alternator instruction voltage is returned by the ECU 30. The ECU 30 increases the alternator instruction voltage to return the alternator instruction voltage reduced in step S33 to an original voltage. Note that when the brake is turned ON for the first time while a fuel cut control is being performed, the ECU 30 increases the alternator instruction voltage up to a predetermined voltage. The ECU 30 increases the alternator instruction voltage to, for example, a maximum selectable voltage. When the alternator instruction voltage is increased, the ECU 30 gradually increases the alternator instruction voltage. The ECU 30 increases the alternator instruction voltage at, for example, a constant voltage gradient. When step S35 is performed, the control flow is finished.

According to the FC-time power generation amount control of the embodiment, when the brake operation is not performed, the alternator instruction voltage becomes a relatively low voltage. With the operation, an increase of a deceleration of the vehicle 100 can be suppressed and a chance at which an accelerator operation is performed by the driver to reduce the deceleration can be reduced. Further, even when the accelerator operation is performed by the driver to reduce the deceleration, since a depression amount of an accelerator pedal becomes small, a resume of a fuel injection is suppressed. As illustrated in FIG. 14, when the accelerator operation is performed at a time t27, a deceleration desired by the driver is reached by an accelerator open degree smaller than that when the FC-time power generation amount control is not performed. Further, when the vehicle 100 becomes travelling while being accelerated, timing, at which the driver starts the accelerator operation, is delayed than when the FC-time power generation amount control is performed, and thereby an accelerator operating amount itself and an increasing speed of the accelerator operating amount become small. With the operation, timing at which the fuel injection is started is delayed (refer to a time t28). As described above, according to the FC-time power generation amount control of the embodiment, an execution period of the fuel cut control can be extended. Further, when the brake operation is performed, the battery 40 can be charged by securing a sufficient power generation amount by increasing the alternator instruction voltage.

The FC-time power generation amount control based on the brake operation of the embodiment is performed in addition to, for example, the FC-time power generation amount control based on the accelerator operation. That is, when the accelerator operation is performed while the fuel cut control is being performed, the FC-time power generation amount control of the respective embodiments based on the accelerator operation is performed, and the FC-time power generation amount control of the embodiment based on the brake operation is performed to the brake operation while the fuel cut control is being performed. In the case, it is sufficient to set the predetermined voltage V4 to a voltage between a minimum voltage which can only cover insufficient battery power and a maximum selectable voltage. With the operation, when the brake operation is performed from the state that the alternator instruction voltage is set to the predetermined voltage V4, an increase of the alternator instruction voltage can reduce the alternator instruction voltage in accordance with that the brake is turned OFF thereafter. In contrast, when the accelerator operation is performed from the state that the alternator instruction voltage is set to the predetermined voltage V4 state, the alternator instruction voltage can be reduced from the predetermined voltage V4.

Further, the FC-time power generation amount control based on the accelerator operation and the FC-time power generation amount control based on the brake operation may be selectively performed. For example, while the fuel cut control is being performed, only any one of the FC-time power generation amount control based on the accelerator operation or the FC-time power generation amount control based on the brake operation may be performed based on a changed state SOC of the battery 40. When the FC-time power generation amount control based on accelerator operation is performed at the time the charged state SOC has been lowered, there is an advantage that the charged state SOC the battery 40 can be easily recovered. The FC-time power generation amount control based on the brake operation is performed at the time the charged state SOC has been sufficiently secured, a chance at which the accelerator operation is performed to reduce the deceleration can be reduced. Further, a vehicle control system 1-1 may perform only the FC-time power generation amount control based on the brake operation without performing the FC-time power generation amount control based on accelerator operation.

Note that when the power generation amount of the alternator 6 is not controlled based on the brake operation of the driver while the fuel cut control is being performed, it becomes easy to keep the alternator instruction voltage to a high voltage and thus there is an advantage that the power generation amount of the alternator 6 can be preferentially secured.

Fifth Embodiment

A fifth embodiment will be explained referring to FIGS. 15 to 17. As to the fifth embodiment, components which have functions similar to those of the embodiment explained above are denoted by the same reference numerals and a duplicate explanation will not be repeated. The embodiment is different from the fourth embodiment in that an alternator instruction voltage is increased when a deceleration starts and that a control start condition of an FC-time power generation amount control is determined by a falling edge of a brake switch 23.

Figure 15:
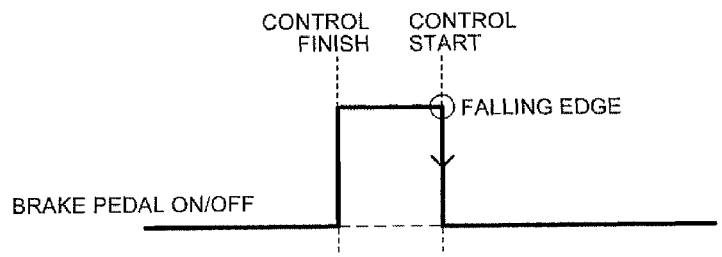
FIG. 15 is a view illustrating a control start condition of a fifth embodiment.

FIG. 15 is a view explaining the control start condition of the FC-time power generation amount control based on a brake operation in the embodiment. An ECU 30 uses a detection of the falling edge of the brake switch 23 as the control start condition in place of the brake OFF of the fourth embodiment. The falling edge shows a change start section of a signal output from the brake switch 23 at which the signal starts to change from a signal state showing a brake ON to a signal state showing a brake OFF. When the falling edge of the brake switch 23 is used as the control start condition as described above, a responsiveness of the FC-time power generation amount control to a deceleration reduction request of a driver can be improved.

Further, in the embodiment, when a deceleration travel is started, the ECU 30 increases the alternator instruction voltage before a brake operation is performed (from times t31 to t32 of FIG. 17). That is, at the time of an initial coast after the start of a deceleration, the ECU 30 does not reduce the alternator instruction voltage and increases the alternator instruction voltage even if a brake is turned OFF. With the operation, a power generation amount for charging a battery 40 can be secured making use of a period from the start of the deceleration to the time at which the brake operation is performed. Note that since the control for increasing the alternator instruction voltage after the deceleration starts corresponds to a preparation stage for making a room for reducing the alternator instruction voltage in the FC-time power generation amount control, the control may be assumed to constitute a part of the FC-time power generation amount control.

An operation of the embodiment will be explained referring to FIGS. 16 and 17. FIG. 16 is a flowchart illustrating the operation of the embodiment, and FIG. 17 is a time chart illustrating the operation of the embodiment when the FC-time power generation amount control of the embodiment is performed. In FIG. 17, (a) shows a vehicle speed, (b) shows a state of a brake switch, (c) shows an accelerator open degree, (d) shows a fuel injection amount, and (e) shows the alternator instruction voltage. In FIG. 17, respective solid lines shows a transition of respective values in a vehicle 100 of the embodiment which can perform the FC-time power generation amount control based on the brake operation. Further, respective broken lines show an example of a transition of the respective values when the FC-time power generation amount control based on the brake operation is not performed.

Figure 16:
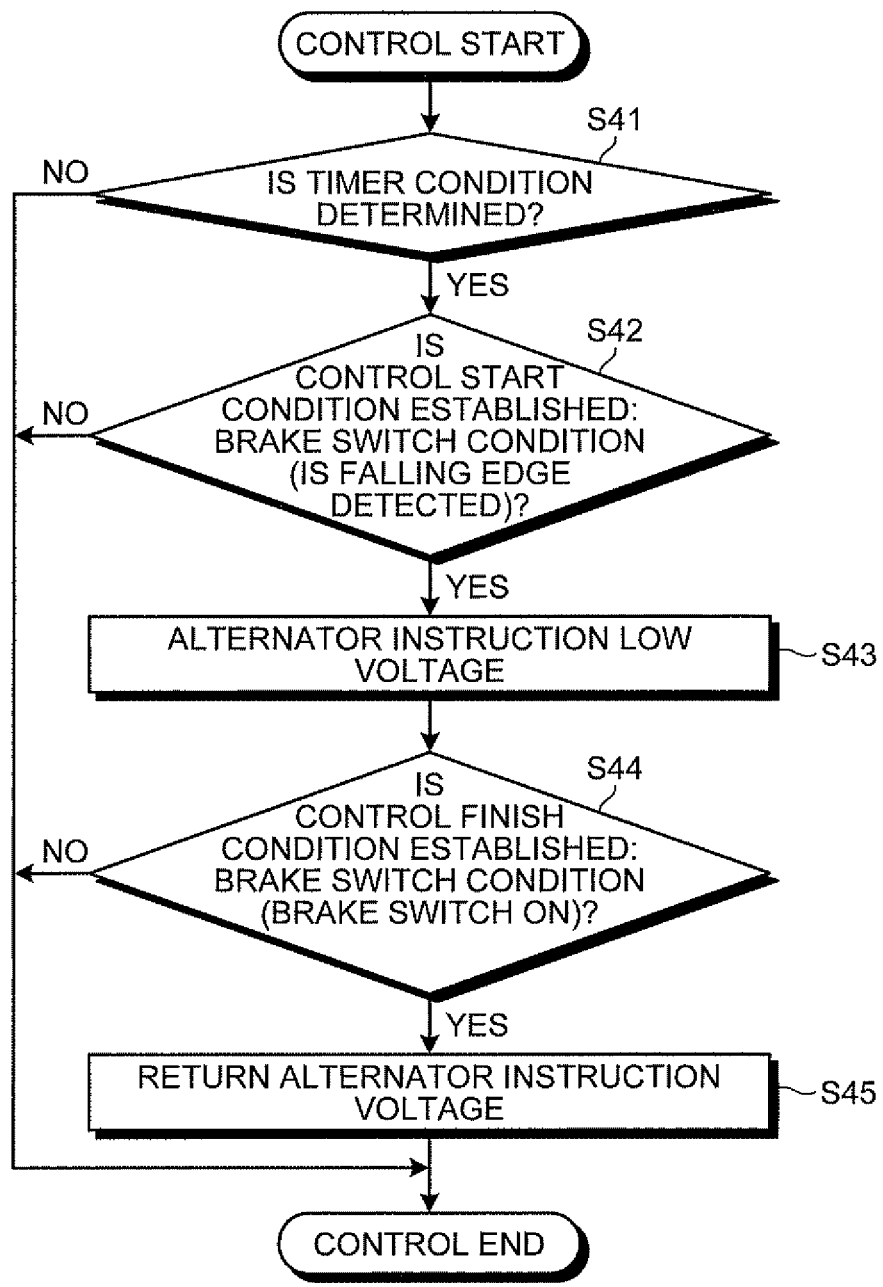
FIG. 16 is a flowchart illustrating an operation of the fifth embodiment.

A control flow illustrated in FIG. 16 is performed while a fuel cut control is being performed and is repeatedly performed at, for example, a predetermined interval. First, in step S41, whether or not a timer condition is established is determined by the ECU 30. When a change of brake ON and brake OFF is detected a predetermined number of times or more within a preset predetermined time up to the time, the ECU 30 assumes that the timer condition is not established and prohibits starting the FC-time power generation amount control. As a result of the determination, when it is determined that the timer condition is established (step S41—Y), a process goes to step S42 and otherwise (step S41—N) the control flow is finished.

In step S42, whether or not the control start condition is established is determined by the ECU 30. When the ECU 30 detects the falling edge of the brake switch 23, the ECU 30 determines that the control start condition is established. In FIG. 17, the falling edge of the brake switch 23 is detected at each of times t33, t35, t37 and the control start condition is established. As a result of the determination in step S42, when it is determined that the timer condition is established (step S42—Y), the process goes to step S43 and otherwise (step S42—N) the control flow is finished.

In step S43, the alternator instruction voltage is set to a low voltage by the ECU 30. The ECU 30 gradually reduces the alternator instruction voltage to a preset predetermined voltage V5. The predetermined voltage V5 can be determined likewise, for example, the predetermined voltage V4 of the fourth embodiment. Further, a voltage gradient when the alternator instruction voltage is reduced may be made to a guard value of a voltage change speed likewise the voltage gradient or may be determined in accordance with the deceleration and the vehicle speed as in the first embodiment. Although the voltage gradient may be a uniform gradient, the voltage gradient is not limited thereto and may change while the alternator instruction voltage is being reduced. When step S43 is performed, the process goes to step S44.

In step S44, whether or not a control finish condition is established is determined by the ECU 30. When the brake switch 23 is turned ON, the ECU 30 determines that the control finish condition is established. In FIG. 17, the control finish condition is established at times t34 and t36, respectively, by turning ON a brake. As a result of the determination in step S44, when it is determined that the control finish condition is established (step S44—Y), the process goes to step S45 and otherwise (step S44—N) the control flow is finished.

In step S45, the alternator instruction voltage is returned by the ECU 30. The ECU 30 increases the alternator instruction voltage to return the alternator instruction voltage reduced in step S43 to an original voltage. At the time, the ECU 30 gradually increases the alternator instruction voltage. The ECU 30 increases the alternator instruction voltage at, for example, a constant voltage gradient. When step S45 is performed, the control flow is finished.

The FC-time power generation amount control of the embodiment has an advantage that a responsiveness of the FC-time power generation amount control to a deceleration reduction request of a driver can be improved by using the detection of the falling edge of the brake switch 23 as the control start condition in addition to the effect of the FC-time power generation amount control of the fourth embodiment. Further, the power generation amount for charging the battery 40 can be secured making use of a period from the start of the deceleration to the time at which the brake operation is performed.

Note that contents disclosed in the respective embodiments can be performed by being appropriately combined.

INDUSTRIAL APPLICABILITY

As described above, the vehicle control system according to the present invention is suitable to extend an execution period of a fuel cut control.

REFERENCE SIGNS LIST 1-1 VEHICLE CONTROL SYSTEM
1 ENGINE
6 ALTERNATOR
6b VOLTAGE REGULATOR
21 ACCELERATOR OPEN DEGREE SENSOR
22 THROTTLE OPEN DEGREE SENSOR
30 ECU
40 BATTERY
100 VEHICLE
APPhold CONTROL START ACCELERATOR OPEN DEGREE
TA THROTTLE OPEN DEGREE
TA1 ISC PORTION OPEN DEGREE

The invention claimed is:

1. A vehicle control system for use by a driver in a vehicle having an engine as a power source, the vehicle control system comprising:
an alternator configured to generate power, the alternator being driven by torque transmitted from the engine and being capable of adjusting a power generation amount; and
a fuel cut control configured to stop supply of fuel to the engine, wherein
in response to an accelerator open degree exceeding predetermined open degree while a fuel cut control is being performed during traveling of the vehicle, a power generation amount of the alternator is: (i) decreased when the accelerator open degree exceeds the predetermined open degree and the accelerator pedal is not released, and (ii) increased when the accelerator pedal is released, and
the predetermined open degree being larger than zero.

2. The vehicle control system according to claim 1, wherein
the predetermined open degree is an accelerator open degree in which a throttle open degree is changed to a larger throttle open degree than a throttle open degree when the accelerator pedal is not depressed.

3. The vehicle control system according to claim 1, wherein
the predetermined open degree is an open degree within an accelerator open degree in which a throttle open degree is not changed with respect to an open degree when the accelerator pedal is not depressed.

4. The vehicle control system according to claim 1, wherein
a control of decreasing the power generation amount of the alternator is performed by controlling the power generation amount of the alternator based on at least any one of an accelerator open degree, a throttle open degree, and target values as to a driving force of the vehicle based on the accelerator open degree.

5. The vehicle control system according to claim 1, wherein
the predetermined open degree is an open degree smaller than the accelerator open degree at which a supply of fuel to the engine is resumed.

6. The vehicle control system according to claim 5, wherein
in the control of decreasing the power generation amount of the alternator, the power generation amount of the alternator is reduced up to a power generation amount in accordance with at least any one of an accelerator operation of the driver and a deceleration of the vehicle.

7. The vehicle control system according to claim 5, wherein
in the control of decreasing the power generation amount of the alternator, the power generation amount of the alternator is reduced to a selectable lower limit power generation amount.

8. The vehicle control system according to claim 5, wherein
in the control of decreasing the power generation amount of the alternator, the power generation amount of the alternator is gradually changed.

9. The vehicle control system according to claim 1, wherein
while the fuel cut control is being performed, the power generation amount of the alternator is controlled based on a brake physical amount which changes in accordance with a brake operation of the driver.

10. The vehicle control system according to claim 9, wherein
a control start condition in the control of the power generation amount based on the brake physical amount resides in that the brake physical amount changes from a value showing brake on to a value showing brake off, and
the power generation amount of the alternator when the power generation amount is controlled based on the brake physical amount is smaller than the power generation amount of the alternator just before the control of the power generation amount based on the brake physical amount is started.

11. The vehicle control system according to claim 1, wherein
the power generation amount of the alternator is not controlled based on the brake operation of the driver while the fuel cut control is being performed.

* * * * *